(12) United States Patent
Shiina et al.

(10) Patent No.: US 8,413,758 B2
(45) Date of Patent: Apr. 9, 2013

(54) VEHICLE FRAME WITH DETACHABLE UPPER TENSION PIPE

(75) Inventors: Hiromitsu Shiina, Saitama (JP);
Akihiro Yamashita, Saitama (JP);
Hajime Uchiyama, Saitama (JP);
Tatsuya Shiokawa, Saitama (JP);
Yukinori Kurakawa, Saitama (JP);
Masayuki Hirukawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 155 days.

(21) Appl. No.: 13/005,858

(22) Filed: Jan. 13, 2011

(65) Prior Publication Data

US 2011/0174569 A1   Jul. 21, 2011

(30) Foreign Application Priority Data

Jan. 15, 2010   (JP) .................. 2010-007334

(51) Int. Cl.
*B62D 21/12* (2006.01)

(52) U.S. Cl. ........ 180/311; 180/291; 180/312; 280/781; 280/785; 296/205

(58) Field of Classification Search ............. 180/89.1, 180/89.11, 68.4–68.6, 291, 298, 311, 312; 180/908; 280/783, 785, 124.1, 124.134, 280/124.135, 124.145, 124.146, 124.154; 296/205
See application file for complete search history.

(56) References Cited

U.S. PATENT DOCUMENTS

| | | | | |
|---|---|---|---|---|
| 3,945,463 | A * | 3/1976 | Okano et al. .............. | 184/6.13 |
| 4,170,272 | A * | 10/1979 | Smolinski ................. | 180/227 |
| 4,461,366 | A * | 7/1984 | Honda ...................... | 180/229 |
| 4,623,167 | A * | 11/1986 | Matsubayashi et al. ..... | 280/798 |
| 4,770,262 | A * | 9/1988 | Yasunaga et al. .......... | 180/68.1 |
| 4,805,716 | A * | 2/1989 | Tsunoda et al. ........... | 180/219 |
| 5,284,221 | A * | 2/1994 | Warne ....................... | 180/219 |
| 5,699,872 | A * | 12/1997 | Miyakawa et al. .......... | 180/291 |
| 5,975,624 | A * | 11/1999 | Rasidescu et al. ........ | 296/203.01 |
| 6,186,550 | B1 * | 2/2001 | Horii et al. ................ | 280/833 |
| 6,622,666 | B2 * | 9/2003 | Kuji .......................... | 123/41.1 |
| 6,626,260 | B2 * | 9/2003 | Gagnon et al. ............ | 180/291 |
| 6,702,058 | B2 * | 3/2004 | Ishii et al. ................. | 180/311 |
| 6,799,781 | B2 * | 10/2004 | Rasidescu et al. ......... | 280/781 |
| 6,851,691 | B2 * | 2/2005 | Rasidescu et al. ..... | 280/124.135 |
| 6,902,023 | B2 * | 6/2005 | Brendelson et al. ....... | 180/228 |
| 7,171,938 | B2 * | 2/2007 | Muramatsu ............... | 123/196 R |
| 7,252,170 | B2 * | 8/2007 | Miyakozawa et al. ...... | 180/219 |
| 7,306,069 | B2 * | 12/2007 | Takeshima et al. ......... | 180/312 |
| 7,357,418 | B2 * | 4/2008 | Takahashi .................. | 280/779 |
| 7,513,516 | B2 * | 4/2009 | Ryan ..................... | 280/124.109 |

(Continued)

FOREIGN PATENT DOCUMENTS

| | | | | |
|---|---|---|---|---|
| JP | 01311974 | A | * | 12/1989 |
| JP | 03136990 | A | * | 6/1991 |
| JP | 05065085 | A | * | 3/1993 |
| JP | 2008-114617 | A | | 5/2008 |

*Primary Examiner* — Paul N Dickson
*Assistant Examiner* — Laura Freedman
(74) *Attorney, Agent, or Firm* — Birch, Stewart, Kolasch & Birch, LLP

(57) ABSTRACT

The vehicle body frame is configured in a manner that an upper tension pipe is removed from a first cross portion and a second cross portion. When mounting the engine in the vehicle body frame, the vehicle mounted component that is relatively heavy can be lowered into the vehicle body frame from above by removing the upper tension pipe. The vehicle body frame simplifies the removal and installation of the vehicle-mounted components.

15 Claims, 18 Drawing Sheets

U.S. PATENT DOCUMENTS

| | | | |
|---|---|---|---|
| 7,618,063 B2* | 11/2009 | Takeshima et al. | 280/785 |
| 7,637,338 B2* | 12/2009 | Maltais et al. | 180/215 |
| 7,730,986 B2* | 6/2010 | Takeshima et al. | 180/68.5 |
| 7,806,215 B2* | 10/2010 | Codere et al. | 180/210 |
| 7,918,301 B2* | 4/2011 | Ito et al. | 180/219 |
| 7,950,491 B2* | 5/2011 | Isoda et al. | 180/311 |
| 8,104,565 B2* | 1/2012 | Miyashiro et al. | 180/311 |
| 8,133,292 B2* | 3/2012 | Morita et al. | 55/385.3 |
| 2004/0035623 A1* | 2/2004 | Fecteau et al. | 180/210 |
| 2008/0223648 A1* | 9/2008 | Shiraishi | 180/312 |
| 2009/0000845 A1* | 1/2009 | Smith et al. | 180/219 |
| 2011/0175340 A1* | 7/2011 | Shiina et al. | 280/835 |
| 2011/0239994 A1* | 10/2011 | Hirukawa | 123/520 |
| 2011/0240396 A1* | 10/2011 | Shiina et al. | 180/309 |
| 2011/0240397 A1* | 10/2011 | Shiina et al. | 180/312 |

* cited by examiner

VEHICLE FRAME WITH DETACHABLE UPPER TENSION PIPE

CROSS-REFERENCE TO RELATED APPLICATIONS

The present application claims priority under 35 USC 119 to Japanese Patent Application No. 2010-007334 filed on Jan. 15, 2010 the entire contents of which are hereby incorporated by reference.

BACKGROUND OF THE INVENTION

1. Field of the Invention

The present invention relates to a vehicle body frame structure in a vehicle, and in particular to improvements to a vehicle body frame structure of an all terrain vehicle.

2. Description of Background Art

A vehicle body frame for an all terrain vehicle is known which incorporates an upper frame, a lower frame and a down frame in a staged configuration. See, for example, FIG. 1 and FIG. 2 of JP-A No. 2008-114617. More specifically, as shown in FIG. 2 of JP-A No. 2008-114617, the vehicle body frame (4) (The figures in the brackets refers to reference numerals stated in JP-A No. 2008-114617. The same applies hereafter.) is constituted by two upper frames (31, 31), lower frames (32, 32) and down frames (35, 35).

In accordance with this type of vehicle body frame structure, an engine (5) as shown in FIG. 1 of JP-A No. 2008-114617 can be removed or installed from the side of the vehicle body. In other words, since the engine (5) that is a heavy body must be inserted from a space in the frame, a margin exists for improvement from an operational point of view.

Furthermore, since two upper frames (31) are arranged on the right and the left, there are a high number of frames, the structure of the frame of the vehicle body becomes complicated. Thus, an increase in the weight of the vehicle body frame occurs.

Consequently, there is a need for a vehicle body frame structure in which the weight can be reduced. In addition, there is a need to simplify the installation or removal processes of vehicle-mounted components such as the engine.

SUMMARY AND OBJECTS OF THE INVENTION

The present invention addresses the problem of providing a vehicle that has a vehicle body frame that reduces the weight and simplifies assembly characteristics and the installation or removal of vehicle-mounted components such as electrical components including the battery, or the engine.

According to an embodiment of the present invention, a vehicle includes a vehicle body frame, a power generating engine that is mounted on the vehicle body frame for generating power and a power transmission apparatus that transmits the output generated by the power generating engine to the vehicle wheels. The vehicle body frame includes a pair of right and left main frames passing below the power generating engine in a longitudinal direction of the vehicle and in which a rear portion curves upwardly, right and left front-wheel suspension support portions that are configured from a frame or a pipe that extends upwardly from the front portion of the main frame to thereby support a front-wheel suspension apparatus, a first cross portion that passes in the transverse direction of the vehicle from the left front-wheel suspension portion to the right front-wheel suspension portion, a second cross portion that passes in the transverse direction of the vehicle from a curved portion of the rear portion of the left main frame to a curved portion of the rear portion of the right main frame, and an upper tension pipe that passes above the power generating engine in a longitudinal direction of the vehicle, that has a front end thereof mounted detachably on the first cross portion, and that has a rear end thereof mounted detachably on the second cross portion.

According to an embodiment of the present invention, the front-wheel suspension support portion is constituted by a front pipe portion extending upwardly from the main frame and a front tension bracket portion that reinforces the front pipe portion by passing in an inclining configuration across an upper portion of the front pipe portion and the main frame. The upper ends of the pair of right and left front pipe portions are connected by the first cross portion. The first cross portion is configured by a U-shaped pipe portion opening downwardly when viewed from the front of the vehicle. The U-shaped pipe portion is connected to the right and left front pipe portions. The right and left front pipe portions and the U-shaped pipe portion are configured by a single curved pipe.

According to an embodiment of the present invention, a front shock absorber mounting portion that mounts a front shock absorber is provided on the front pipe portion, and a rear shock absorber mounting portion that mounts an upper portion of the rear shock absorber is provided on the second cross portion.

According to an embodiment of the present invention, the rear shock absorber is disposed in an inclining configuration so that the lower portion is positioned in the rear of the vehicle relative to the upper portion, and a rear portion of the upper tension pipe is curved to incline downwardly to follow the inclined rear shock absorber shaft. The upper portion of the front pipe is characterized in being curved so that the upper is positioned more towards the rear of the vehicle than the lower.

According to an embodiment of the present invention, the number of the upper tension pipes is one, and the upper tension pipe is provided on the vehicle body center line.

According to an embodiment of the present invention, the front steering shaft bearing portion that supports the steering shaft is provided in the first cross portion, the rear steering shaft bearing portion that supports the steering shaft is provided on the front end of the upper tension pipe, and the steering shaft is rotatably supported by aligning the front steering shaft bearing and the rear steering shaft bearing with the longitudinal direction of the vehicle.

According to an embodiment of the present invention, the power steering unit is sandwiched by the right and left front tension brackets by fixing the power steering unit that assists in the rotational operation of the steering shaft to the right and left front tension brackets.

According to an embodiment of the present invention, an accessory equipment support portion that supports accessory equipment such as the air cleaner, the battery or the like, and the electrical component support portion that supports electrical components such as the ignition coil and the like are attached to the upper tension pipe.

According to an embodiment of the present invention, the main frame is such that the height and the width of the frame decrease with respect to the central portion as the front portion moves forward in the longitudinal direction of the vehicle. The height and the width of the frame decrease with respect to the central portion as the rear portion moves rearwardly in the longitudinal direction of the vehicle.

According to an embodiment of the present invention, when the vehicle is viewed in a plan configuration, a front curved portion and a rear curved portion are provided on the right and left main frames so that the interval between the right and left main frames in the transverse direction of the vehicle is such that the front portion and the rear portion narrow relative to the central portion.

According to an embodiment of the present invention, the rigidity of the vehicle body frame with the main frame and the front-wheel suspension support portion is ensured by passing the first cross portion and the second cross portion that extend in a vehicle transverse direction over the vehicle body frame that is formed in the shape of a reversed letter "C" when viewed from the side. In addition to that configuration, the upper tension pipe is connected detachably to the first cross portion and the second cross portion. When mounting the vehicle-mounted components such as the engine, a vehicle-mounted component that is a heavy body can be lowered into the vehicle body frame from above by removing the upper tension pipe.

Thus according to the present invention, a vehicle is provided that includes a vehicle body frame that facilitates insertion and removal of vehicle-mounted components.

According to an embodiment of the present invention, the front-wheel suspension support portion is constituted by a front pipe portion extending upwardly from the main frame, and a front tension bracket portion that reinforces the front pipe portion by passing in an inclining configuration across the upper portion of the front pipe portion and the main frame. The upper ends of the pair of right and left front pipe portions are connected by the first cross portion.

The front pipe portion is reinforced by the inclining front tension bracket to ensure rigidity of the front-wheel suspension support portion with respect to the vehicle longitudinal direction, and the weight of the front-wheel suspension support portion can be reduced.

In addition, the first cross portion is configured by a U-shaped pipe portion opening downwardly when viewed from the front of the vehicle. The U-shaped pipe portion is connected to the right and left front pipe portions, and the right and left front pipe portions and the U-shaped pipe portion are configured by a single curved pipe.

Since the right and left front pipe portions and the U-shaped pipe portion are configured by the single curved pipe, the number of constituent components of the front-wheel suspension support portion can be reduced.

According to an embodiment of the present invention, a front shock absorber mounting portion that mounts a front shock absorber is provided on the front pipe portion, and a rear shock absorber mounting portion that mounts an upper portion of the rear shock absorber is provided on the second cross portion.

Since the force from the front shock absorber is transmitted smoothly to the vehicle body frame through the first cross portion, and the force from the rear shock absorber is transmitted smoothly to the vehicle body frame through the second cross portion, the rigidity of the vehicle body frame is easily ensured.

According to an embodiment of the present invention, the rear shock absorber is disposed in an inclining configuration so that the lower portion is positioned in the rear of the vehicle relative to the upper portion, and a rear portion of the upper tension pipe is curved to incline downwardly to follow the inclined rear shock absorber shaft. The upper portion of the front pipe is curved so that the upper is positioned more towards the rear of the vehicle than the lower.

Since the rear portion of the upper tension pipe is curved to incline downwardly, the force from the rear shock absorber is transmitted smoothly to the upper tension pipe. In the same manner, since the upper portion of the front pipe portion is curved so that the upper is positioned more to the rear of the vehicle than the lower, the force from the front shock absorber is transmitted smoothly to the upper tension pipe.

According to an embodiment of the present invention, the number of the upper tension pipes is one, and the upper tension pipe is provided on the vehicle body center line.

Since one upper tension pipe is provided, the weight of the vehicle body frame can be reduced.

According to an embodiment of the present invention, the front steering shaft bearing portion that supports the steering shaft is provided in the first cross portion. The rear steering shaft bearing portion that supports the steering shaft is provided on the front end of the upper tension pipe. The steering shaft is rotatably supported by aligning the front steering shaft bearing and the rear steering shaft bearing with the longitudinal direction of the vehicle.

By the use of the first cross portion, the steering shaft is supported easily with the reduced number of components.

According to an embodiment of the present invention, the power steering unit is sandwiched by the right and left front tension brackets by fixing the power steering unit that assists in the rotation operation of the steering shaft to the right and left front tension brackets.

By the use of the right and left front tension brackets, the power steering unit is supported easily with the reduced number of components.

In addition, the power steering unit can be assembled in advance on the right and left front tension brackets to thereby enable sub-assembly of the front-wheel steering apparatus.

According to an embodiment of the present invention, an accessory equipment support portion that supports accessory equipment such as the air cleaner, the battery or the like, and the electrical component support portion that supports electrical components such as the ignition coil and the like are attached to the upper tension pipe.

Sub-assembly is enabled by concentrating the disposition of the accessory equipment and the electrical components.

Furthermore the accessory equipment and the electrical components and the like can be removed from the integrated vehicle body frame by removing the upper tension pipe, and thereby facilitates maintenance and inspection.

According to an embodiment of the present invention, in the main frame, the height and the width of the frame decreases as the front portion moves forward with respect to the central portion in the longitudinal direction of the vehicle. The height and the width of the frame decreases as the rear portion moves rearwardly with respect to the central portion in the longitudinal direction of the vehicle.

In order to ensure rigidity, the central portion of the main frame with respect to the longitudinal direction of the vehicle has an enlarged frame height and width. In other respects, the height and width of the frame are reduced.

In other words, while ensuring the rigidity of the frame, a deformation is generated to thereby improve the riding performance of the vehicle.

According to an embodiment of the present invention, when the vehicle is viewed in a plan configuration, a front curved portion and a rear curved portion are provided on the right and left main frames so that the interval between the right and the left main frames in the transverse direction of the vehicle is such that the front portion and the rear portion narrow relative to the central portion.

The adjustment of the alignment is facilitated by narrowing the forward direction and riding comfort of the saddle-riding vehicle can be easily ensured by narrowing the rear direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will be described below with reference to the attached drawings. The drawings should be viewed in the direction of the reference signs.

Figure 1:
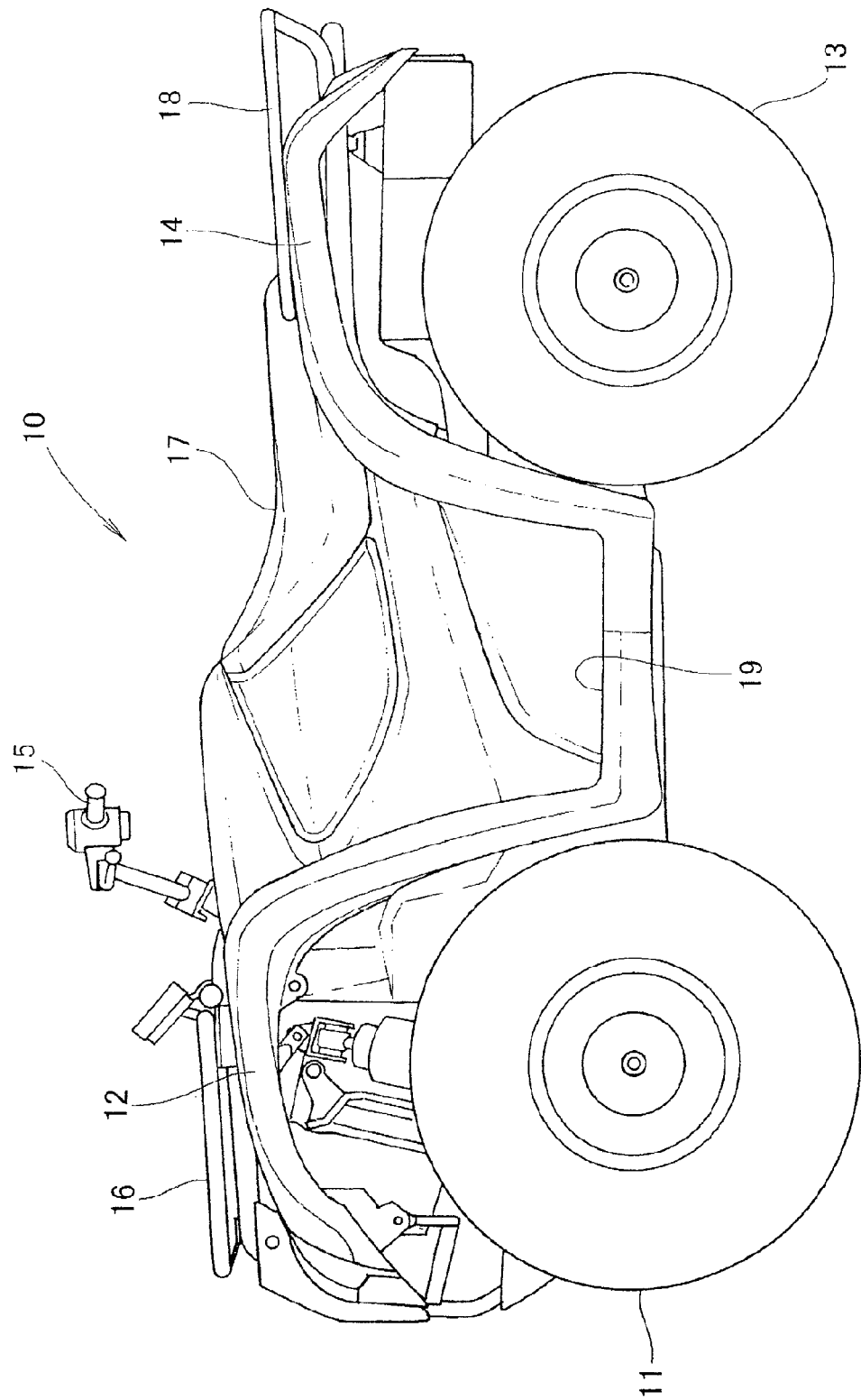
FIG. 1 is a left-sided view of a vehicle.

As shown in FIG. 1, a vehicle 10 is a small vehicle that includes a front wheel 11 on a front lower portion of the vehicle body, a front fender 12 provided above the front wheel 11, a rear wheel 13 provided on the rear lower portion of the vehicle body, a rear fender 14 provided above the rear wheel 13, a steering handlebar 15 provided above the front wheel 11, a front carrier 16 provided in front of the steering handlebar 15, and a seat 17 and a rear carrier 18 provided behind the steering handlebar 15.

Figure 2:
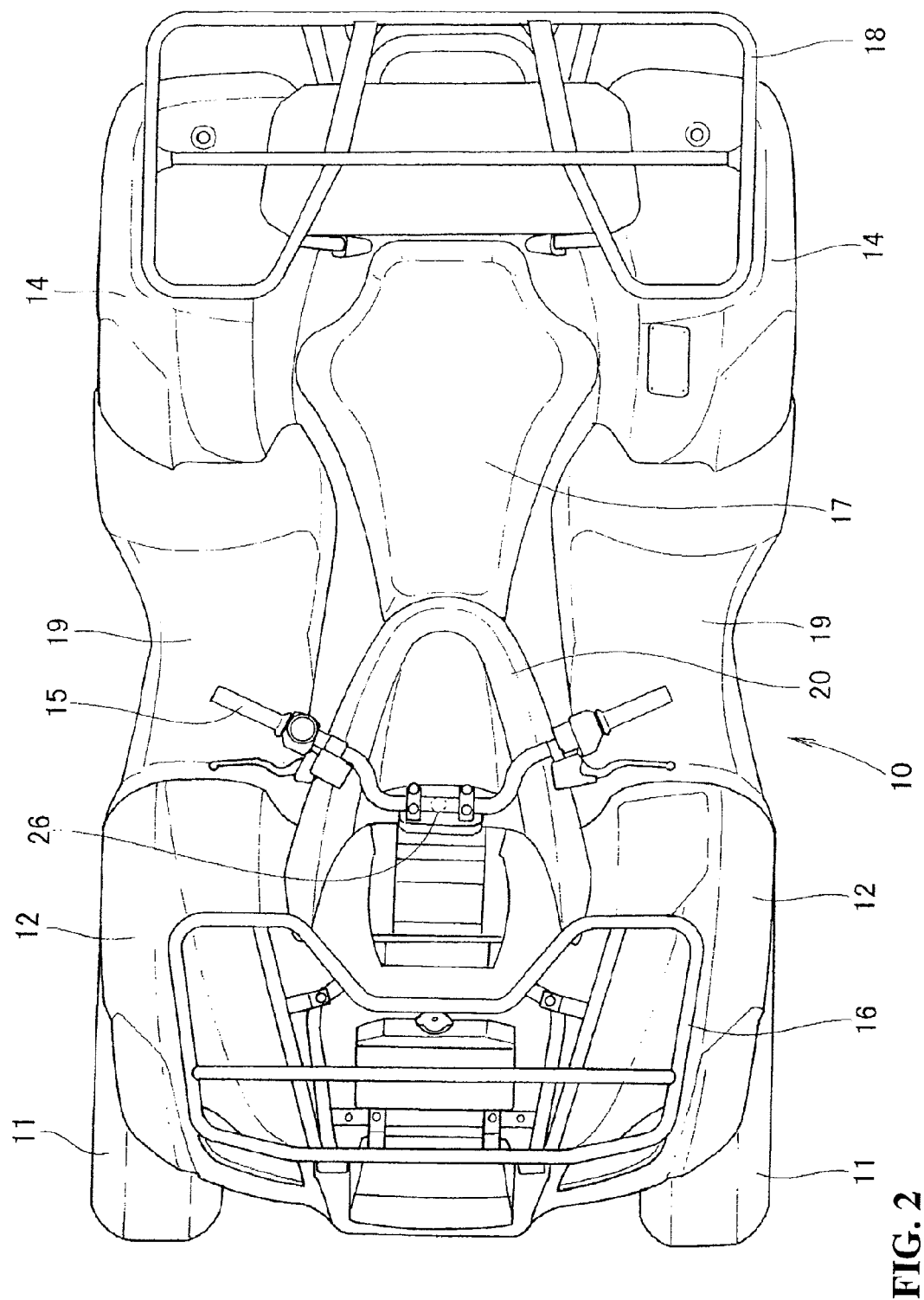
FIG. 2 is a plan view of the vehicle.

The vehicle 10 as shown in FIG. 2 is a saddle-ride type all terrain vehicle that includes a right and left step floor 19, 19 between the steering handlebar 15 and the seat 17 and is adapted to enable the feet of a rider seated on the seat 17 to be mounted on the step floor 19, 19. The vehicle 10 includes a front cover 20 that covers an air cleaner (reference sign 23, FIG. 3) as described below and is disposed between the steering shaft 26 and the seat 17.

Figure 3:
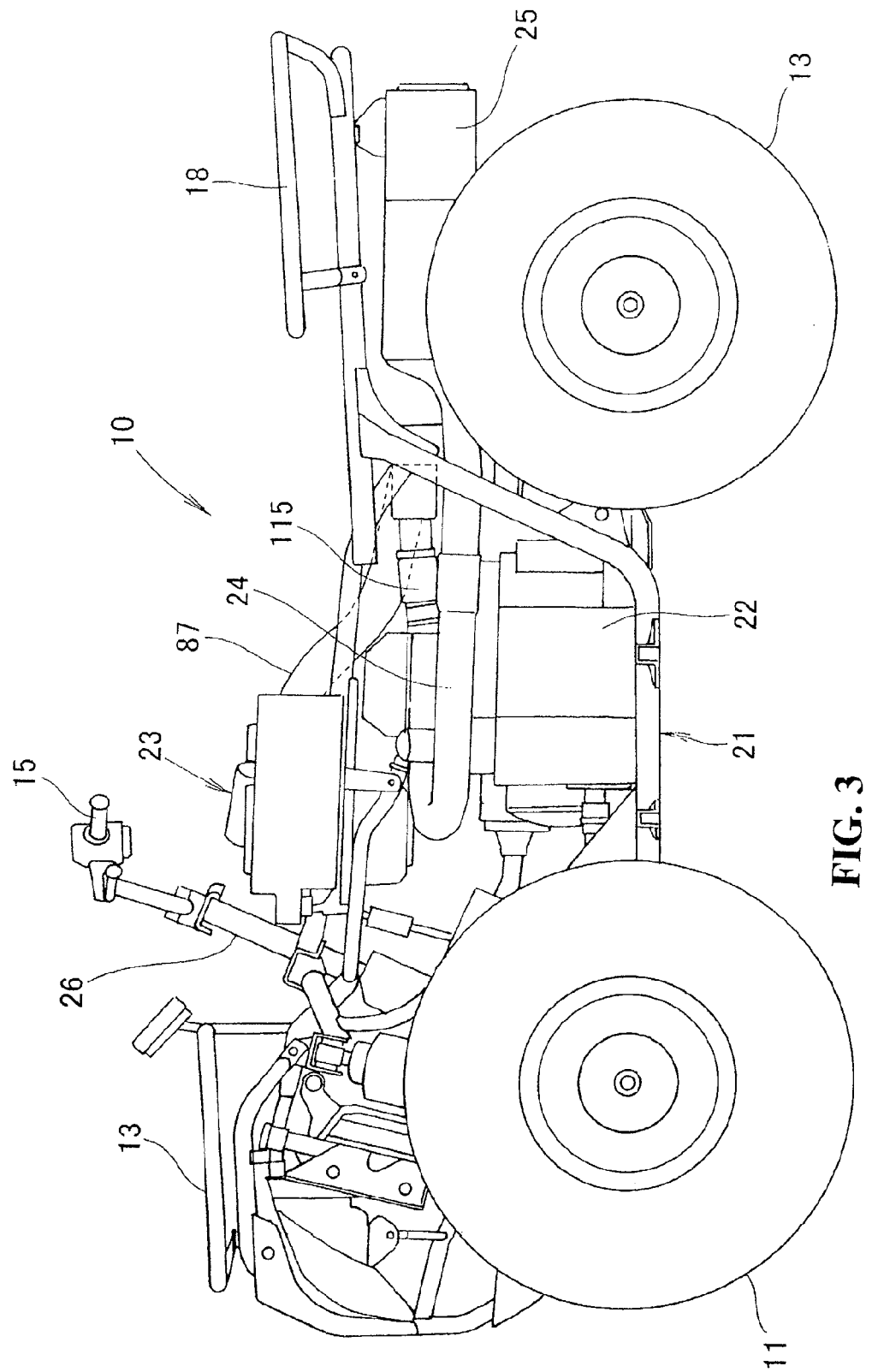
FIG. 3 is a left-side view of the vehicle with a vehicle cover removed.

As shown in FIG. 3, the vehicle 10 is a small vehicle that includes a power generating engine 22 such as a gasoline engine or the like in the center of the vehicle body frame 21. Fuel is mixed in air aspired by the air cleaner 23 provided on top of the vehicle body frame 21, and combusted in the power generating engine 22. Exhaust gas is discharged to the outside through an exhaust pipe 24 extending from the power generating engine 22 and a muffler 25 connected to the rear end of the exhaust pipe 24. Movement of the vehicle is executed by transmitting the resulting drive force to the front wheel 11 rotatably mounted on a front lower portion of the vehicle body frame 21 and/or to the rear wheel 13 rotatably mounted on a rear lower portion of the vehicle body frame 21. The vehicle is steered with the steering shaft 26 rotatably mounted on a front upper portion of the vehicle body frame 21 and the steering handlebar 15 that rotates the steering shaft 26.

The power generating engine 22 may take any configuration as long as it is a driving power source such as a gasoline engine, a diesel engine, an electrical motor, or the like.

When the front wheel 11 and the rear wheel 13 are a wide low-pressure special tire termed a balloon tire, the low-pressure tire absorbs deformations caused by the unevenness of the road surface, and enables suppression of sinkage in the wide tire even when the road surface is weak. Therefore this type of vehicle 10 is termed an all terrain vehicle.

Figure 4:
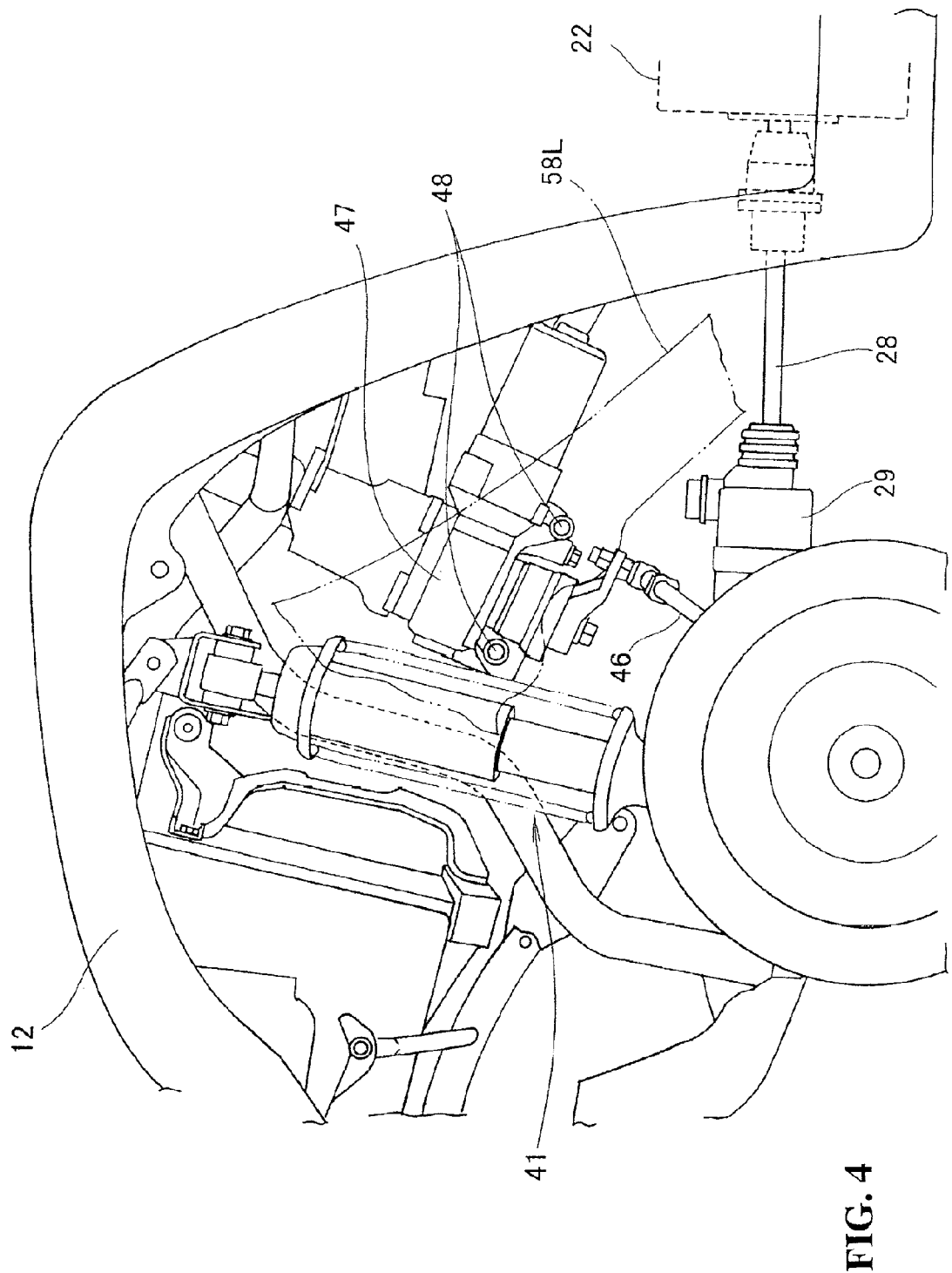
FIG. 4 is a side view illustrating a suspension apparatus of a front wheel.

The power generated by the power generating engine 22 as shown in FIG. 4 is transmitted to a final speed reduction gear 29 by a power transmission apparatus 28 such as a propeller shaft or the like.

Figure 5:
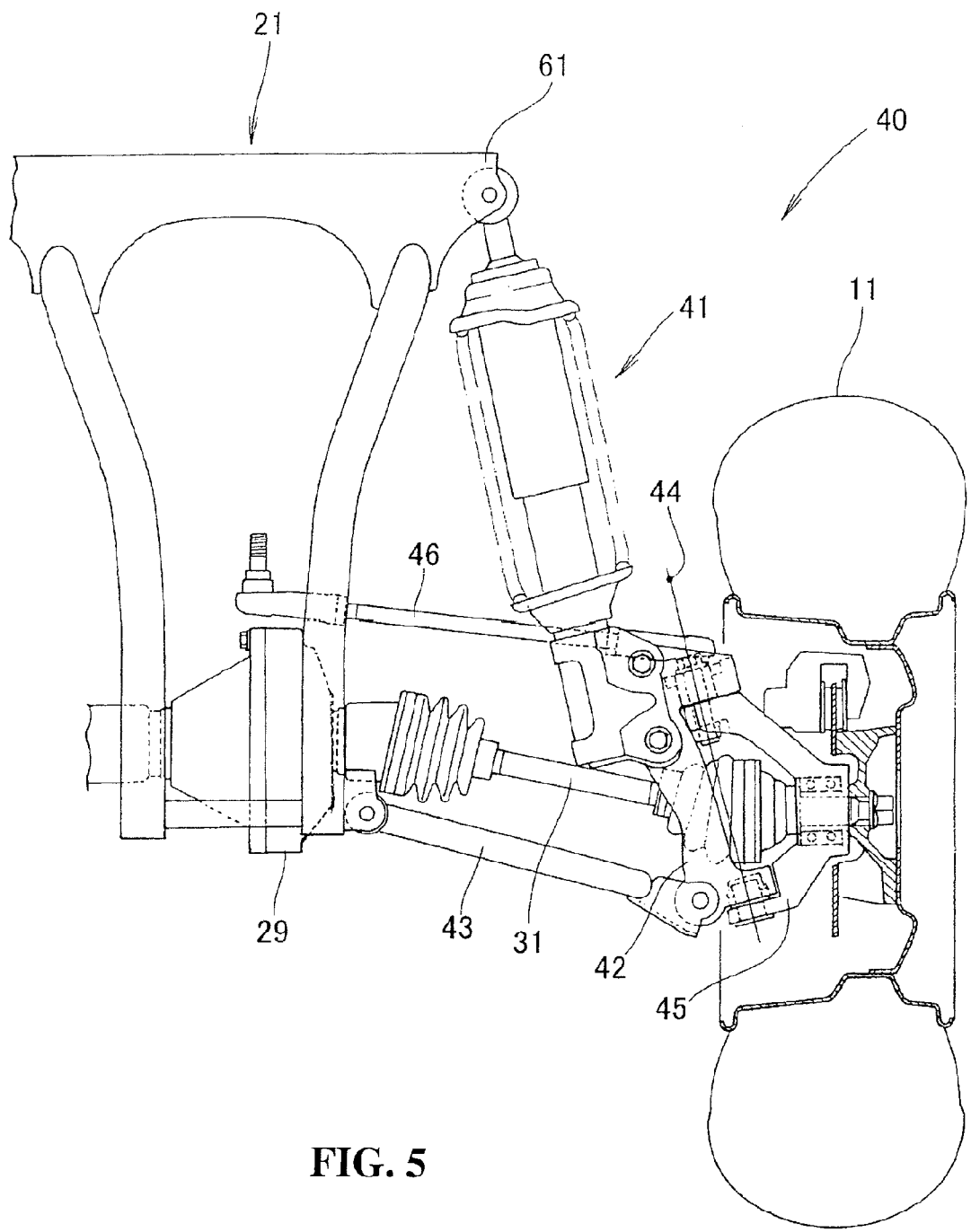
FIG. 5 is a front view illustrating the suspension apparatus of the front wheel.

As shown in FIG. 5, the power is transmitted to the front wheel 11 through a drive shaft 31 that extends from the final speed reduction gear 29 in a transverse direction of the vehicle to thereby drive and rotate the front wheel 11.

A front-wheel suspension apparatus 40 as shown in FIG. 5 includes a front shock absorber 41 extending downwardly and connected at the upper end to the vehicle body frame 21, a knuckle support member 42 extending downwardly from the lower portion of the front shock absorber 41, a lower arm 43 extending in a transverse direction of the vehicle and connecting the lower portion of the knuckle support member 42 to the vehicle body frame 21, a knuckle 45 mounted to freely rotate about a king pin shaft 44 on the knuckle support member 42 and supporting the front wheel 11, and a tie rod 46 extending in a transverse direction of the vehicle and rotating the knuckle 45 about the king pin shaft 44.

The tie rod 46 as shown in FIG. 4 is connected to the output shaft of the power steering unit 47. The power steering unit 47 is fastened by bolts 48, 48 to a front tension bracket portion 58L shown by an imaginary line.

Figure 6:
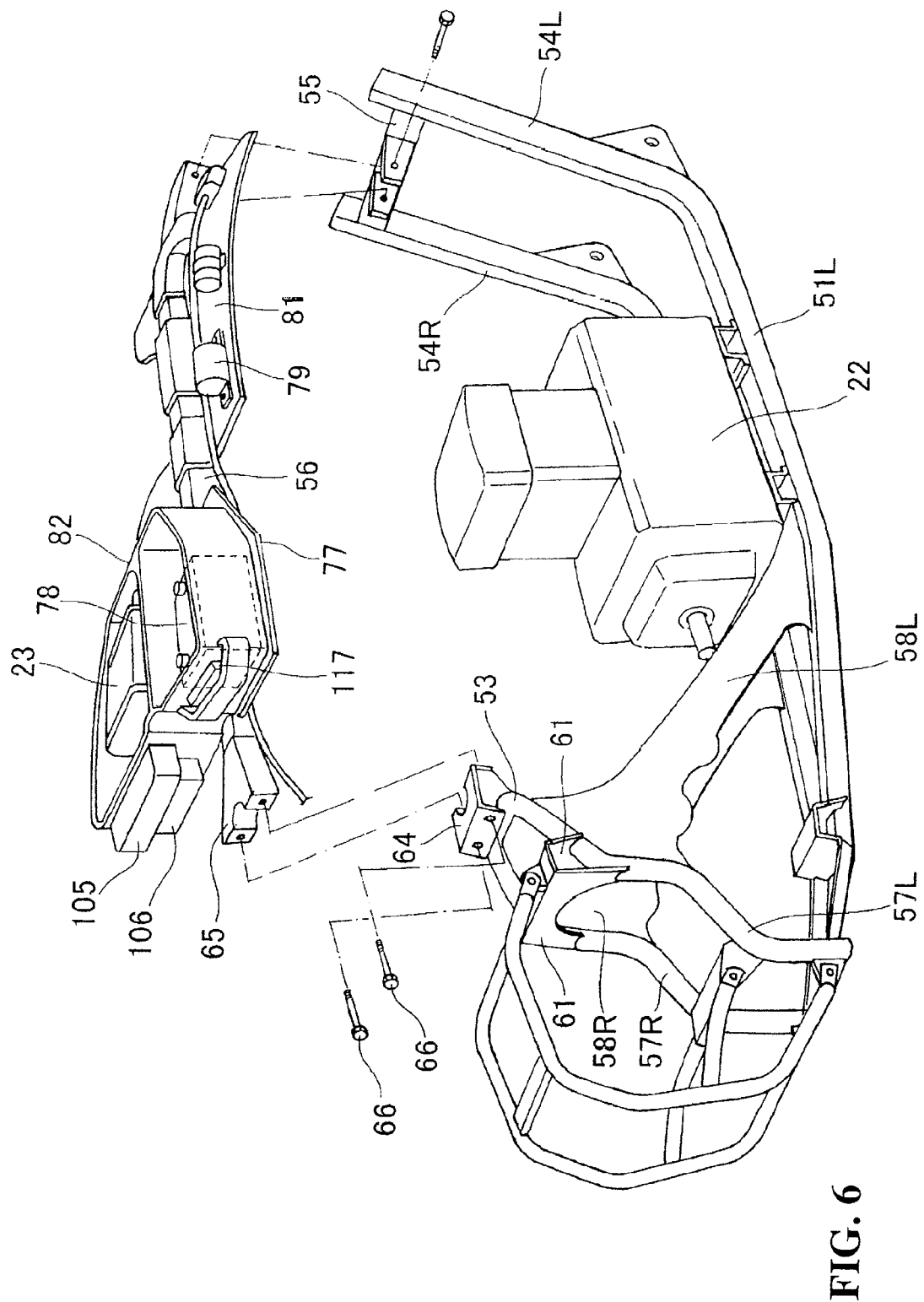
FIG. 6 is an exploded perspective view of a vehicle body frame.

The vehicle body frame 21 as shown in FIG. 6 is structurally characterized by enabling removal of the upper tension pipe 56 from the first cross portion 53 and the second cross portion 55. In this manner, when installing vehicle-mounted components such as the power generating engine 22 or the like, vehicle-mounted components that are heavy bodies can be lowered into the vehicle body frame 21 from above by removing the upper tension pipe 56.

Thus according to the present invention, a vehicle is provided that includes a vehicle body frame that simplifies removal and installation of vehicle-mounted components.

An accessory equipment support portion 77 supporting accessory equipment such as the air cleaner 23, the battery 78 or the like, and the electrical component support portion 81 supporting electrical components such as the ignition coil 79 or the like are attached to the upper tension pipe 56. The sub-assembly is enabled by concentrating the installation of the accessory equipment and the electrical components. Furthermore the accessory equipment and the electrical components and the like can be removed from the integrated vehicle body frame 21 by removing the upper tension pipe 56, to thereby facilitate maintenance and inspection.

The structure of the vehicle body frame 21 that enables the above operation and effect will be described in detail below.

Figure 7:
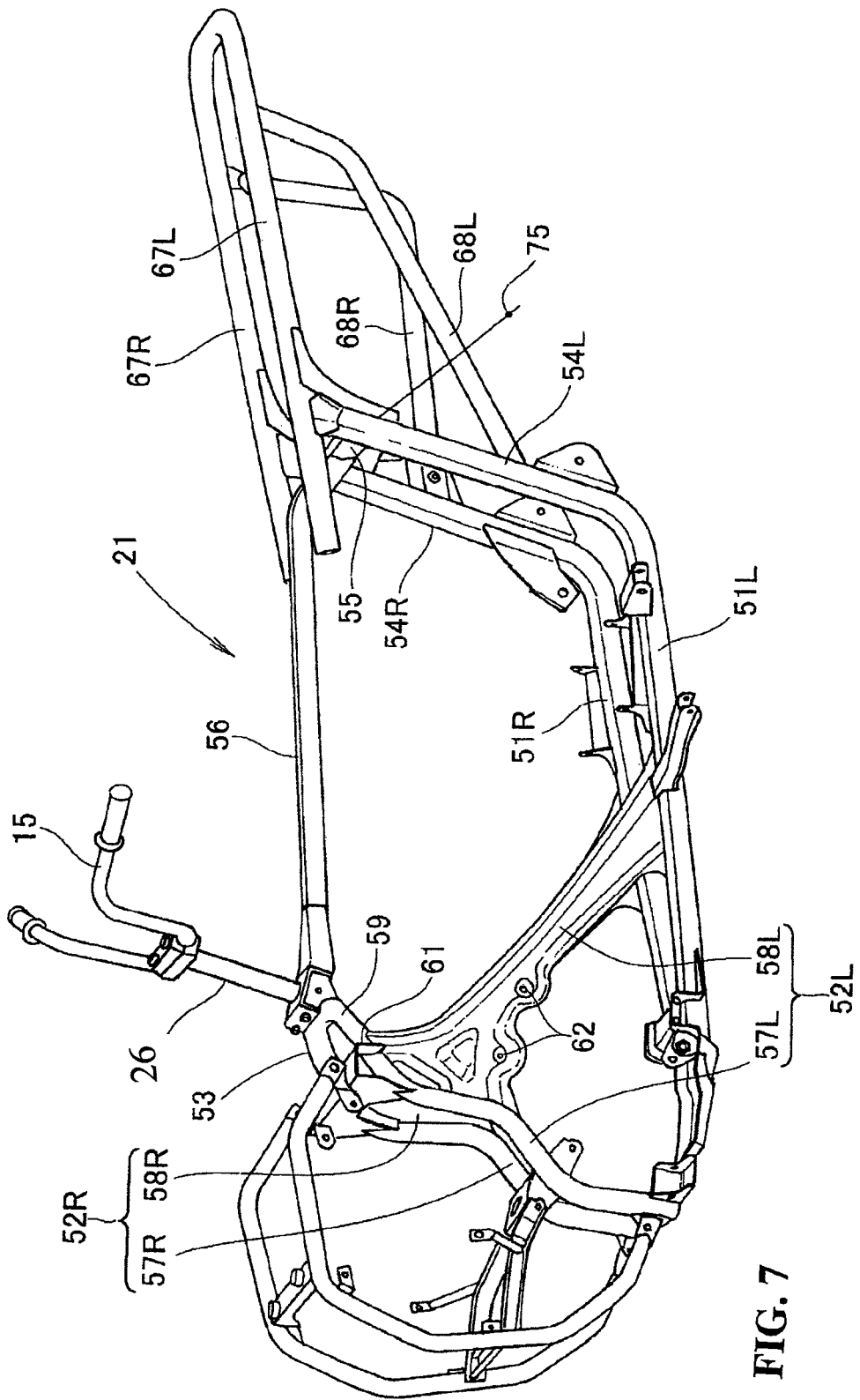
FIG. 7 is a perspective view of the vehicle body frame.

As shown in FIG. 7, the vehicle body frame 21 includes as main elements, a pair of left and right main frames 51L, 51R that pass below the power generating engine (reference sign 22, FIG. 6) with respect to the longitudinal direction of the vehicle, and in which a rear portion curves upwardly (L shows the left seen from the rider, and R shows the right. The same applies hereafter.), a right and left front-wheel suspension support portion 52L, 52R that is configured from a pipe or a frame extending upwardly from the front portion of the main frame 51L, 51R and supports the front-wheel suspension apparatus (reference sign 40, FIG. 5), a first cross portion 53 that passes from the left front-wheel suspension support portion 52L to the right front-wheel suspension support portion 52R in the transverse direction of the vehicle, a second cross portion 55 that passes from the curved portion 54L of the rear portion of the left main frame 51L to the curved portion 54R of the rear portion of the right main frame 51R in the transverse direction of the vehicle, and an upper tension pipe 56 that passes above the power generating engine in the longitudinal direction of the vehicle, a front end of which is detachably mounted on the first cross portion 53, and a rear end of which is detachably mounted on the second cross portion 55.

The upper tension pipe 56 is curved so that the rear portion inclines downwardly.

The front-wheel suspension support portion 52L includes a front pipe portion 57L extending upwardly from the main frame 51L, and a front tension bracket portion 58L that reinforces the front pipe portion 57L by passing in an inclined configuration to the main frame 51L and the upper portion of the front pipe portion 57L. The front-wheel suspension support portion 52R includes a front pipe portion 57R and a front tension bracket portion 58R.

A bolt hole 62, 62 used when fixing the power steering unit (reference sign 47, FIG. 4) is provided on the front tension bracket portion 58L. The front-wheel suspension support portion 52R is configured from the front pipe portion 57R and the front tension bracket 58R.

The upper end of the pair of left and right front pipe portions 57L, 57R is connected by the first cross portion 53, and the first cross portion 53 is configured from a U-shaped pipe portion 59 that opens downwardly when viewed from the front of the vehicle. The U-shaped pipe portion 59 is connected to the left and right front pipe portions 57L, 57R, and the left and right front pipe portions 57L, 57R and the U-shaped pipe portion 59 are configured from a single curved pipe.

Since the left and right front pipe portions 57L, 57R and the U-shaped pipe portion 59 are configured from a single curved pipe, the number of constituent components in the front-wheel suspension support portion can be reduced.

The front shock absorber mounting portion 61 that mounts the front shock absorber (reference sign 41, FIG. 5) is provided on the front pipe portion 57L, 57R.

Since the front shock absorber mounting portion 61 is provided in proximity to the first cross portion 53, the force from the front shock absorber is transmitted smoothly to the vehicle body frame 21 through the first cross portion 53.

The steering shaft 26 that extends downwardly from the steering handlebar 15 supported by the front steering shaft bearing portion 64 and the rear steering shaft bearing portion 65 shown in FIG. 6.

The front steering shaft bearing portion 64 is provided on the first cross portion 53, and the rear steering shaft bearing portion 65 is provided on the distal end of the upper tension pipe 56.

The bearing structure is completed by aligning the front steering shaft bearing portion 64 and the rear steering shaft bearing portion 65 with respect to a longitudinal direction of the vehicle, and fixing with bolts 66, 66.

In other words, by the skillful use of the distal end of the upper tension pipe 56 and the first cross portion 53, the steering shaft (reference sign 26 in FIG. 7) is easily supported with the reduced number of components.

As shown in FIG. 7, a rear pipe 67L, 67R extends towards the rear of the vehicle from the upper end of the curved portion 54L, 54R of the right and left main frame 51L, 51R. The rear pipe 67L, 67R is reinforced by a rear sub-pipe 68L, 68R extending from the center of the direction of height of the curved portion 54L, 54R. The distal end of the rear pipe 67L, 67R when seen from the side of the vehicle extends towards the front of the vehicle from the rear end of the upper tension pipe 56. In other words, the distal end of the rear pipe 67L, 67R when viewed from the side of the vehicle is superimposed on the rear end of the upper tension pipe 56.

Figure 8:
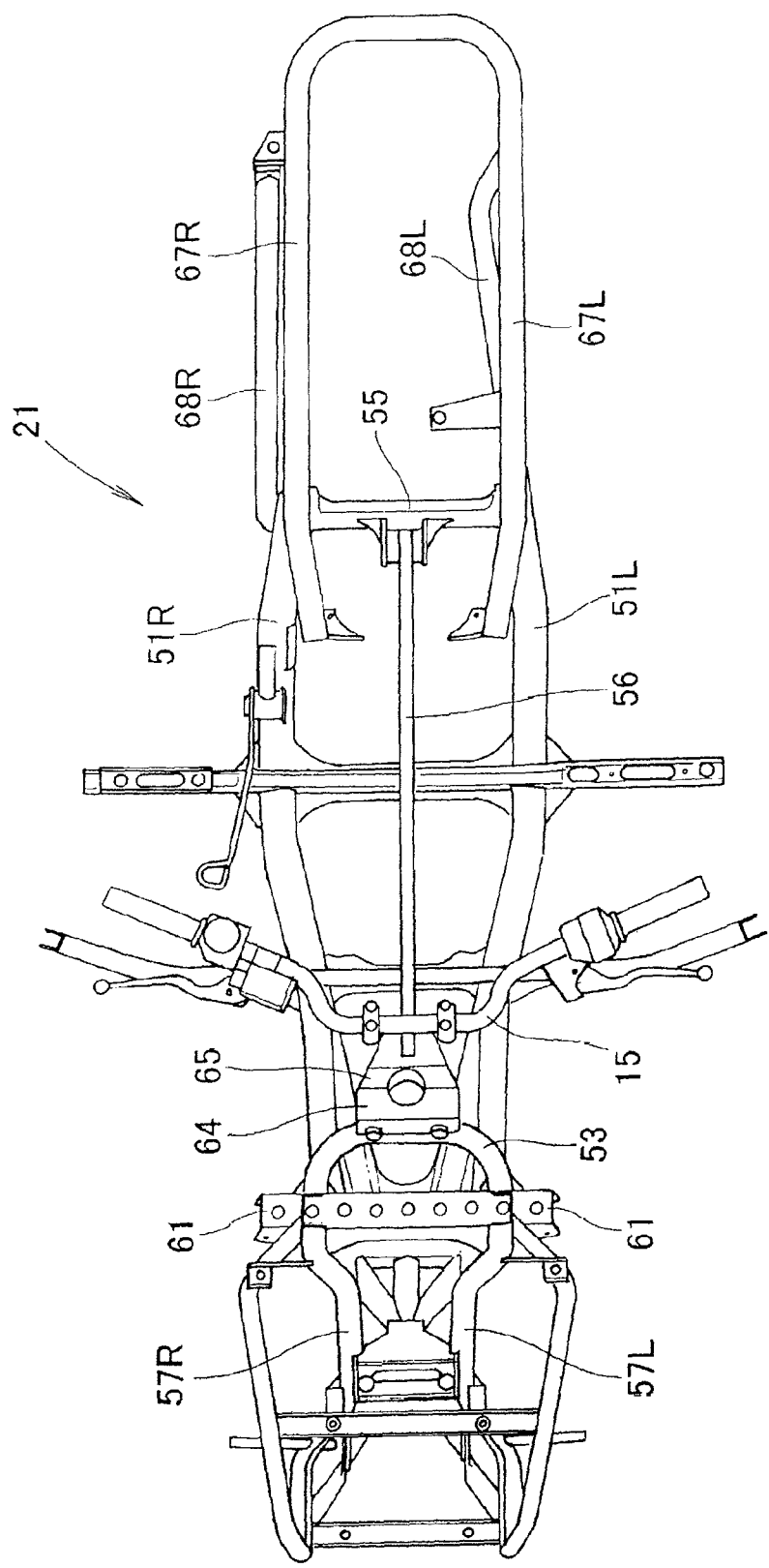
FIG. 8 is a plan view of the vehicle body frame.

A single upper tension pipe 56 is provided on the center line of the vehicle as shown in FIG. 8 which is a plan view of the vehicle body frame. Two right and left upper tension pipes 56 may be provided across the first cross portion 53 and the second cross portion 55, but rather a single pipe enables the following effect.

Since there is a single upper tension pipe the weight of the vehicle body frame can be reduced, and when considering installation or removal, a single pipe enables a reduction in the operation time.

Figure 9:
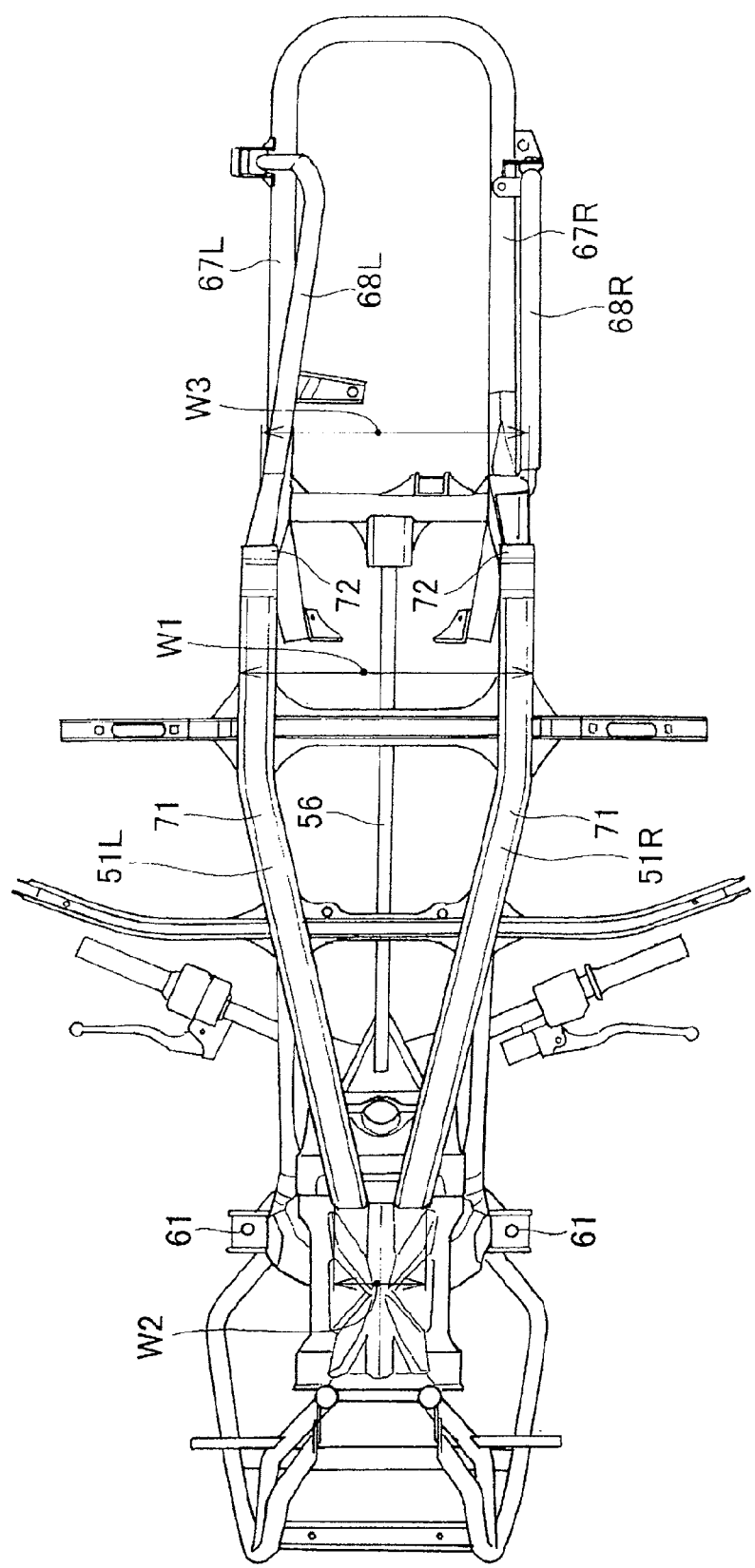
FIG. 9 is a bottom view of the vehicle body frame.

As shown in FIG. 9 which is a bottom view of the vehicle body frame (the letters L and R are inverted), a front curved portion 71 and a rear curved portion 72 are disposed in the left and right main frame 51L, 51R so that the interval (outer width) in a transverse direction of the vehicle of the left and right main frame 51L, 51R is such that relative to W1 presenting the central portion, the interval of the front portion decreases to W2 (W2<W1), and the interval W3 of a rear portion decreases to (W3<W1).

The adjustment of the alignment is facilitated by narrowing the forward direction and riding comfort of the saddle-ride type vehicle can be ensured by narrowing the rear direction.

Figure 10:
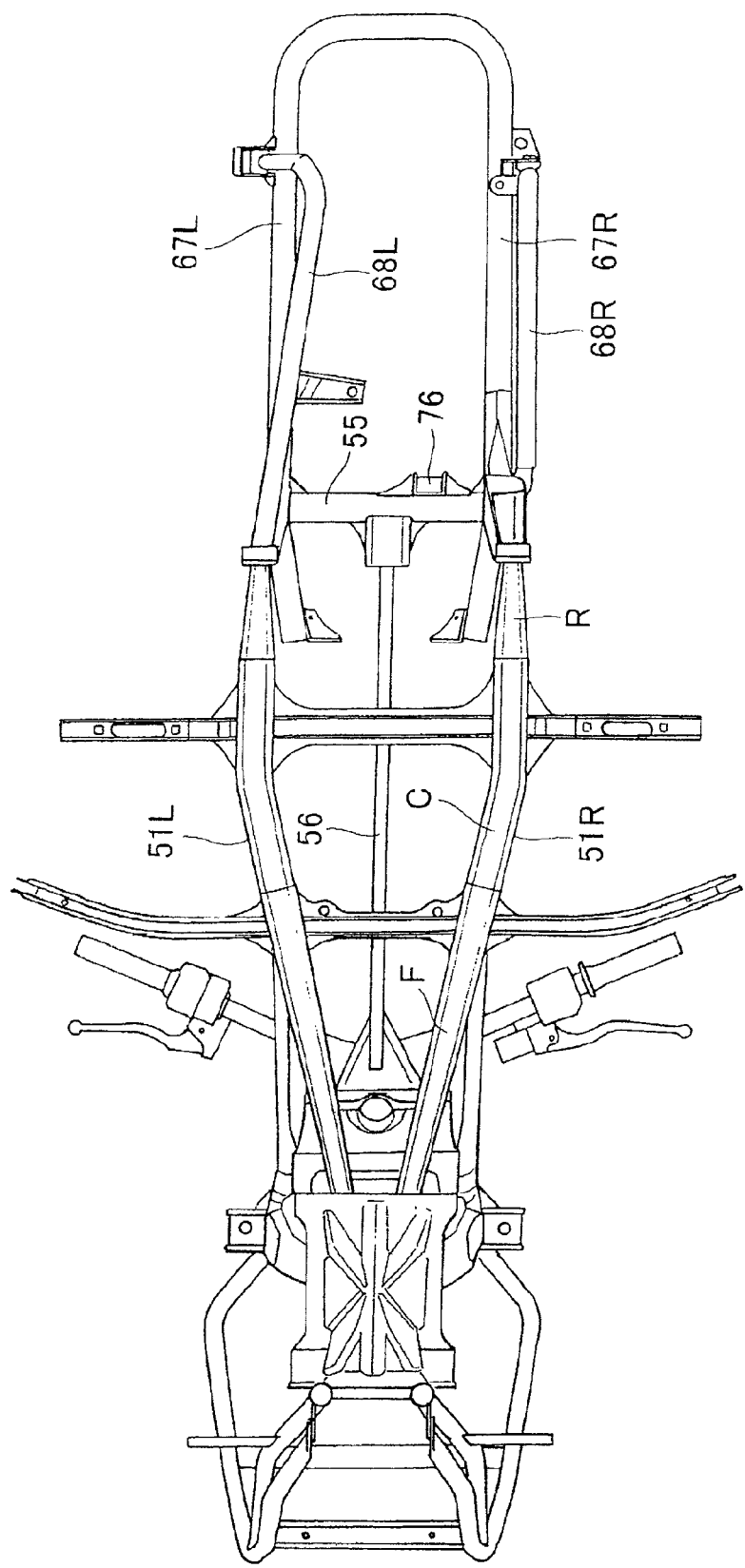
FIG. 10 is variation of FIG. 9.

Furthermore as shown in FIG. 10 that is a variation of FIG. 9, the front portion F of the main frame 51L with respect to the central portion C in the longitudinal direction of the vehicle may be adapted so that the height and the width of the frame decreases in a forward direction, and the rear portion R with respect to the central portion C in the longitudinal direction of the vehicle may be adapted so that the height and the width of the frame decreases in a rear direction. The main frame 51R is configured in the same manner.

Figure 18:
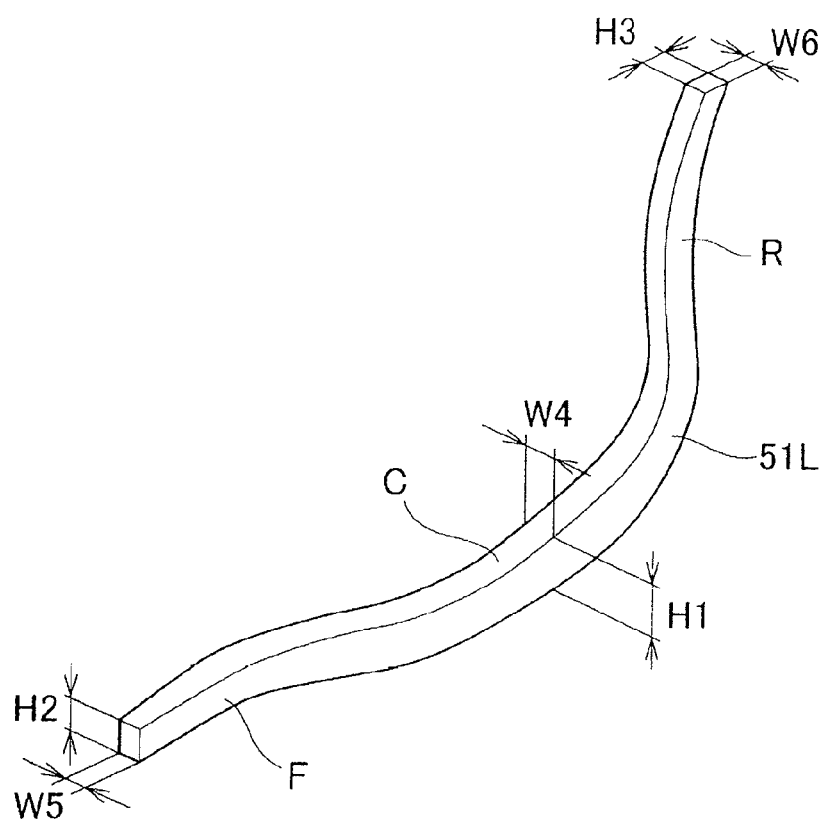
FIG. 18 is a view supplementary to FIG. 10.

More precisely, as shown in FIG. 18 which is a supplementary drawing to FIG. 10, the main frame 51L is curved overall so that the central portion C expands outwardly with respect to a transverse direction of the vehicle, and the front portion F and the rear portion R approach each other at the center of the vehicle width. The height H1 of the main frame 51L of the central portion C is large, the height H2 of the front portion F is small (H2<H1), and the height H3 of the rear portion R is small (H3<H1).

The width W4 of the main frame 51L of the central portion C may be large, the width W5 of the front portion F may be small (W5<W4), and the width W6 of the rear portion R may also be small (W6<W4).

Rigidity is ensured by increasing the height and the width of the frame in the central portion C of the main frame 51L, 51R with respect to the longitudinal direction of the vehicle. In other portions, the height and the width of the frame are reduced.

In other words, while ensuring the rigidity of the frame, a deformation is generated to thereby improve the riding performance of the vehicle.

Next, the mounting configuration of the rear shock absorber will be described.

Figure 11:
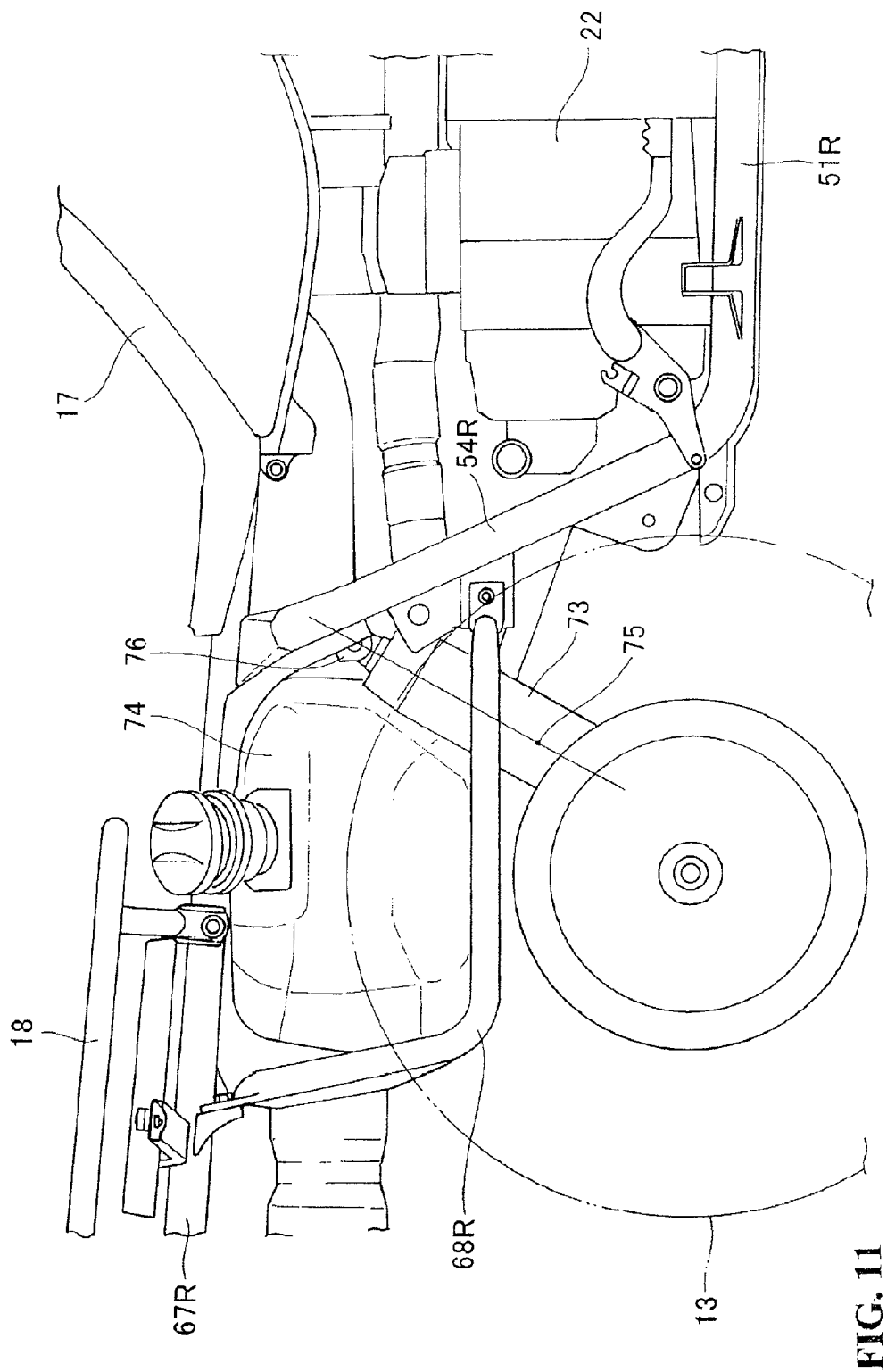
FIG. 11 is a right view of a rear portion of the vehicle.

As shown in FIG. 11, the upper portion of the rear shock absorber 73 is mounted on the rear shock absorber mounting portion 76. The rear shock absorber mounting portion 76 is provided on the second cross portion (reference sign 55 in FIG. 10).

This type of rear shock absorber 73 is disposed so that the upper portion passes the fuel tank 74 in the front of the vehicle and the lower portion inclines relative to the upper portion to a position in the vehicle rear (in the drawing, right is the front of the vehicle).

As a result, the rear shock absorber shaft 75 as shown in FIG. 7 follows the curved shape of the rear portion of the upper tension pipe 56. In that manner, the load of the rear shock absorber that acts towards the rear shock absorber shaft 75 is smoothly transmitted to and supported by the upper tension pipe 56.

The upper portion of the front pipe portion (first cross portion 53) is curved so that the upper is positioned more towards the rear of the vehicle than the lower. The load on the front shock absorber that is applied from the front shock absorber mounting portion 61 is smoothly transmitted to and supported by the upper tension pipe 56.

Next the positioning of the accessory equipment and the electrical components installed on the upper tension pipe 56 will be described in detail.

Figure 12:
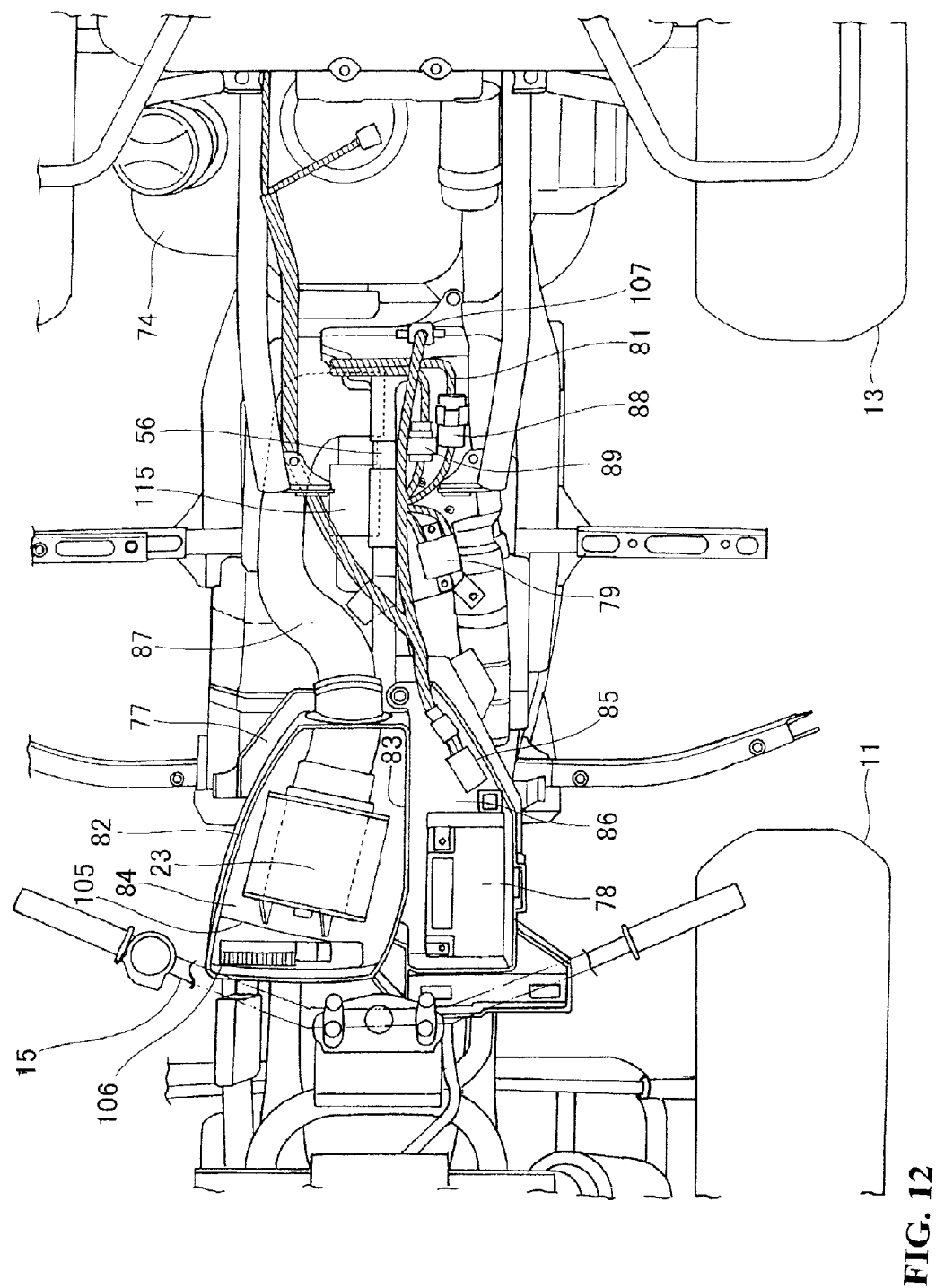
FIG. 12 shows disposition of an accessory equipment support portion and an electrical component support portion.

As shown in FIG. 12, a plate-shaped accessory equipment support portion 77 is mounted on the upper tension pipe 56 in a position more towards the rear of the vehicle than the steering handlebar 15. A battery storage box 82 is mounted on the accessory equipment support portion 77. The side of the battery storage box 82 doubling as the air cleaner facing the rear of the vehicle is constricted into a triangular shape so that the width decreases towards the rear of the vehicle. A space enabling mounting of the feet of an occupant is ensured by constricting as a triangle.

The battery storage box 82 doubling as air cleaner is partitioned into the right and the left by a partitioning wall 83 that extends along the longitudinal direction of the vehicle. The right partition forms an air cleaner storage portion 84 that stores the air cleaner 23, and the left partition forms an electrical component storage portion 86 that stores the battery 78 and the small electrical components that are disposed more towards the rear of the vehicle than the battery 78. In other words, the air cleaner storage portion 84 and the battery 78 are divided on the right and the left relative to the upper tension pipe 56, and therefore improves the weight balance.

In other words, although one battery storage box 82 is an integrated box, the partitioned configuration creates a box that stores the air cleaner 23, the battery 78 and the small electrical components 85.

From the air cleaner 23, a connecting tube 87 extends to the right in a transverse direction of the vehicle of the single upper tension pipe 56 that is disposed in the central transverse direction of the vehicle.

The plate-shaped electrical component support portion 81 is mounted on a rear portion of the single upper tension pipe 56. An ignition coil 79, ACG (alternating current generator) coupler 88, a change switch coupler 89, a bank angle sensor 107 or the like are mounted on the plate-shaped electrical component support portion 81.

Figure 13:
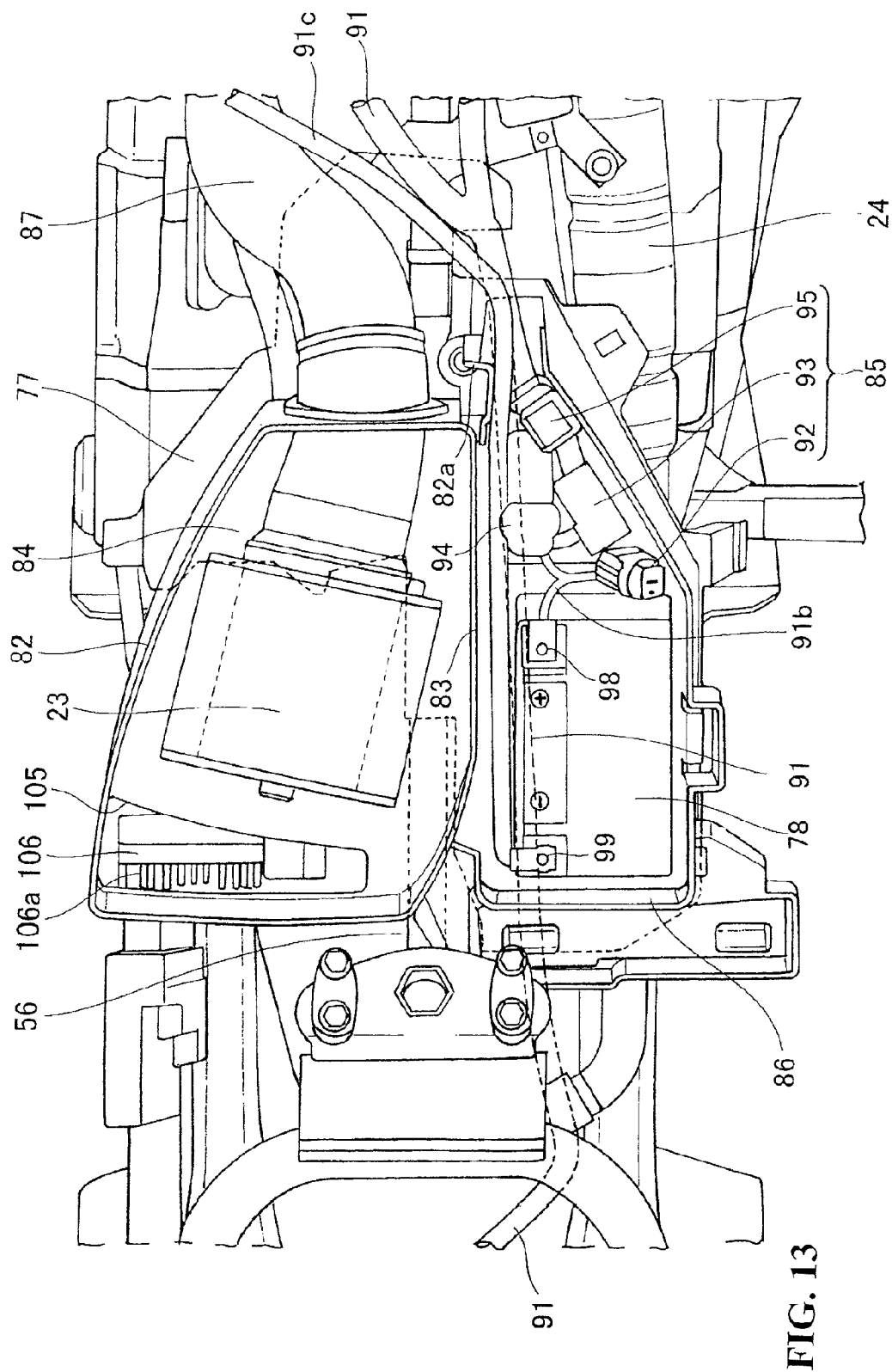
FIG. 13 describes the accessory equipment support portion.

As shown in FIG. 13, the main harness 91 passes under the electrical component storage portion 86, and extends in a longitudinal direction of the vehicle.

The battery 78 is disposed in the electrical component storage portion 86, and the small electrical components 85 are mounted rearwardly of the battery 78.

The small electrical components 85 for example include an EPS fuse 92, a main fuse box 93 that is disposed more towards the rear of the vehicle than the EPS fuse 92, a starter magnet switch 94 disposed on the right transverse direction of the vehicle with respect to the main fuse box 93, and a fuel pump relay 95 disposed in the rear of the vehicle with respect to the main fuse box 93.

An intake duct 105 is provided in a front portion of the air cleaner storage portion 84 of the battery storage box 82. A regulator 106 is disposed below the intake duct 105. The heat radiation fin 106a of the regulator 106 is disposed in a vertically extending configuration. Since the longitudinal direction of the heat radiation fin 106a coincides with the flow direction of aspirated air, air resistance can be reduced and therefore heat radiation efficiency can be improved.

The battery storage box 82 is fastened and fixed to the upper tension pipe 56 by the bottom of the battery 78 and by the rear end portion 82a.

Furthermore the plus terminal 98 of the battery 78, the EPS fuse 92 and the starter magnet switch 94 are connected by a harness 91b, and a harness 91c extending in the longitudinal direction of the vehicle is connected to one terminal 99 of the battery 78.

Next, the configuration of the battery storage box 82 will be described using the left side view and the right side view.

Figure 14:
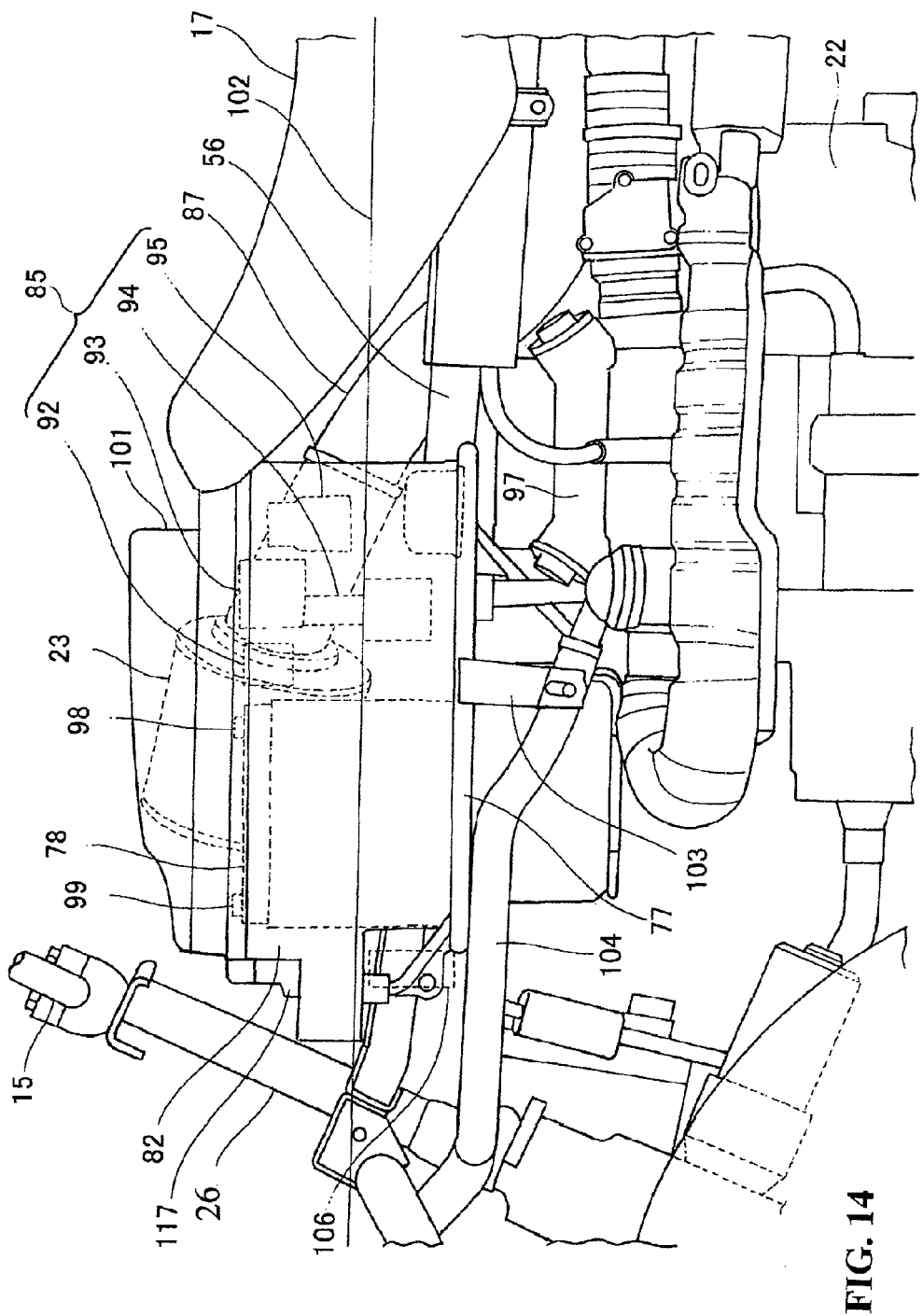
FIG. 14 is a left-side view of a vehicle front portion.

As shown in FIG. 14, the plate-shaped accessory equipment support portion 77 is mounted on the upper tension pipe 56 and the battery storage box 82 doubling as the air cleaner is mounted on the plate-shaped accessory equipment support portion 77.

The air cleaner 23 together with the battery 78 are stored in the battery storage box 82. The battery 78 is disposed rearward of the head pipe 96 in the vehicle, forward of the seat 17, forward of the cylinder 97 of the power generating engine 22, and to the left in a transverse direction of the vehicle of the air cleaner 23 (the front of the drawing).

The plus terminal 98 and the minus terminal 99 of the battery 78 are disposed in proximity to the upper portion of the ad battery storage box 82, that is to say, in proximity to a lid 101.

Furthermore, the small electrical components 85 are disposed in the battery storage box 82.

In other words, the small electrical components 85 include an EPS fuse 92, a main fuse box 93 that is disposed more towards the vehicle rear than the EPS fuse 92, a starter magnet switch 94 disposed below the main fuse box 93, and a fuel pump relay 95 disposed in a vehicle rear position with respect to the main fuse box 93.

A position in proximity to portion between the lower end of the lid 101 and the accessory equipment support portion 77 positioned therebelow is set as an immersion upper limit line 102. The immersion upper limit line 102 is set on a lower end of the intake duct (reference sign 105 in FIG. 15).

Since the majority of the plus terminal 98 and the minus terminal 99 of the battery 78 and the small electrical components 85 are disposed above the immersion upper limit line 102, water resistance performance is improved, and electrical components including the battery 78 can be configured in a non-water resistant configuration.

Furthermore, the hose stay 103 extends downwardly from the accessory equipment support portion 77 and the radiator hose 104 is supported on the hose stay 103. An ECU 117 (refer to also FIG. 6) is disposed on the battery storage box 82 doubling as the air cleaner.

In many conventional vehicles, the battery is disposed for example below the seat 17, and in particular since the distance to the battery becomes separated from the engine perimeter on which electrical components such as sensors and the like tend to be concentrated, the problem arises that the length of the harness is increased.

With respect to this point, since the present embodiment disposes the battery 78 in proximity to the power generating engine 22, the harness length can be reduced. Furthermore since the small electrical components 85 are disposed in proximity to the power generating engine 22, the harness length including the small electrical components 85 can be reduced.

In many conventional vehicles, the problem arises that there is a need to provide a separate and designated battery storage case to store the battery.

With respect to this point, since in the present embodiment, even the battery 78 is stored in the case that stores the air cleaner 23 (the battery storage box 82 ), the battery storage case can be omitted.

Since the battery 78 and the air cleaner 23 are disposed forward of the cylinder of the power generating engine 22, this configuration is preferred since it enables suppression of the effect of heat from the power generating engine 22 in addition to preventing dirt raised by the rear wheel from entering into the air cleaner 23.

As clearly shown in FIG. 12, since the air cleaner 23 is disposed on one side of the center of the vehicle body, and the battery 78 is disposed on the other side, the right and left weight balance is more easily enabled.

Figure 15:
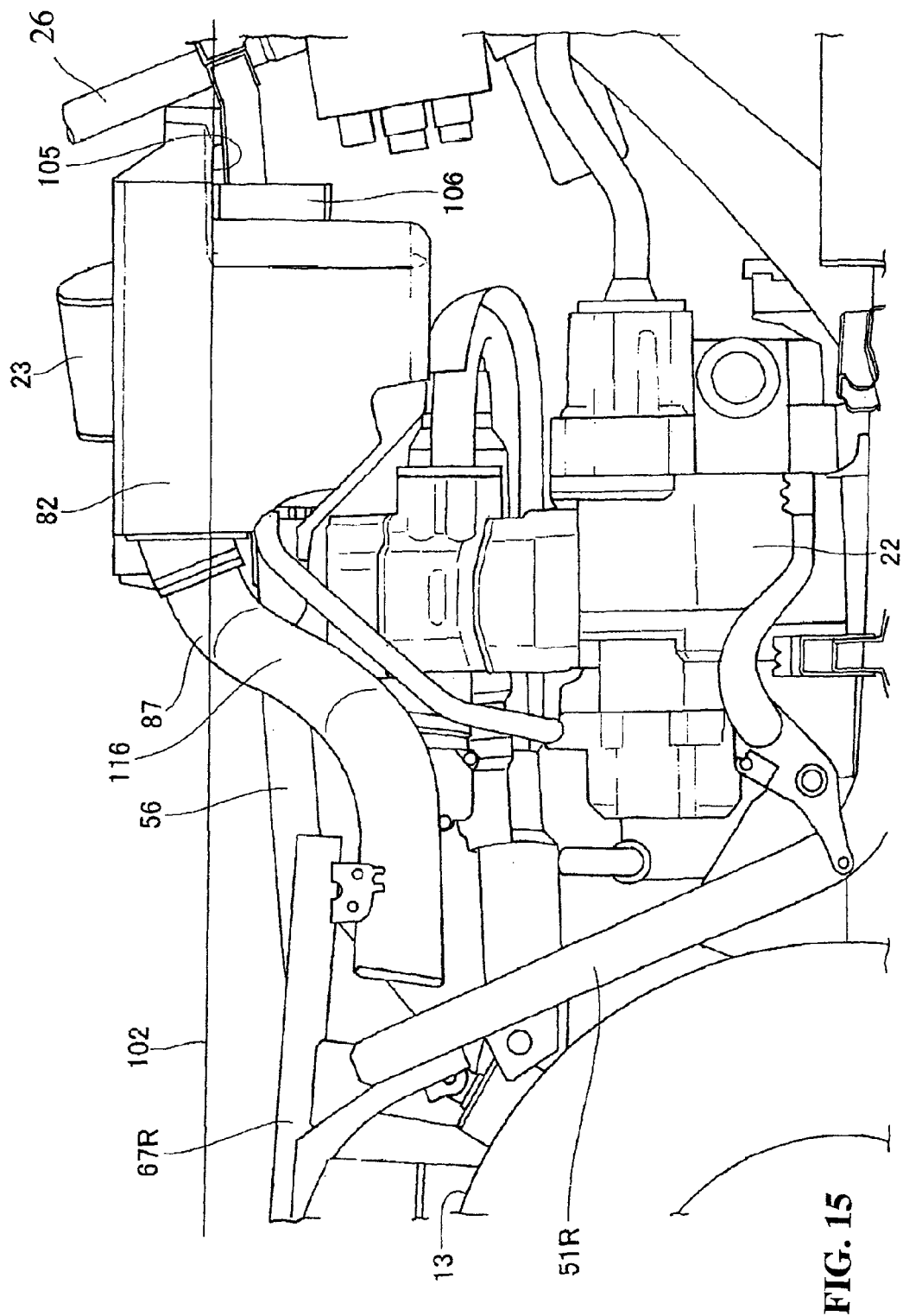
FIG. 15 is a right-side view of the vehicle front portion.

The battery storage box 82 doubling as the air cleaner as shown in FIG. 15 includes an intake duct 105 on the front vehicle side (the right side of FIG. 15). The regulator 106 is disposed below the intake duct 105. Intake air impinges directly on the regulator 106 and thereby exhibits a cooling effect.

Furthermore since the intake duct 105 is disposed in front of the battery storage box 82 doubling as the air cleaner, it is preferred since it further prevents entry of dirt raised by the rear wheel.

The regulator 106 is fastened and fixed to a boss provided on the front wall surface of the battery storage box 82.

Next, supplementary description of the installation of the small electrical components 85 will be provided.

Figure 16:
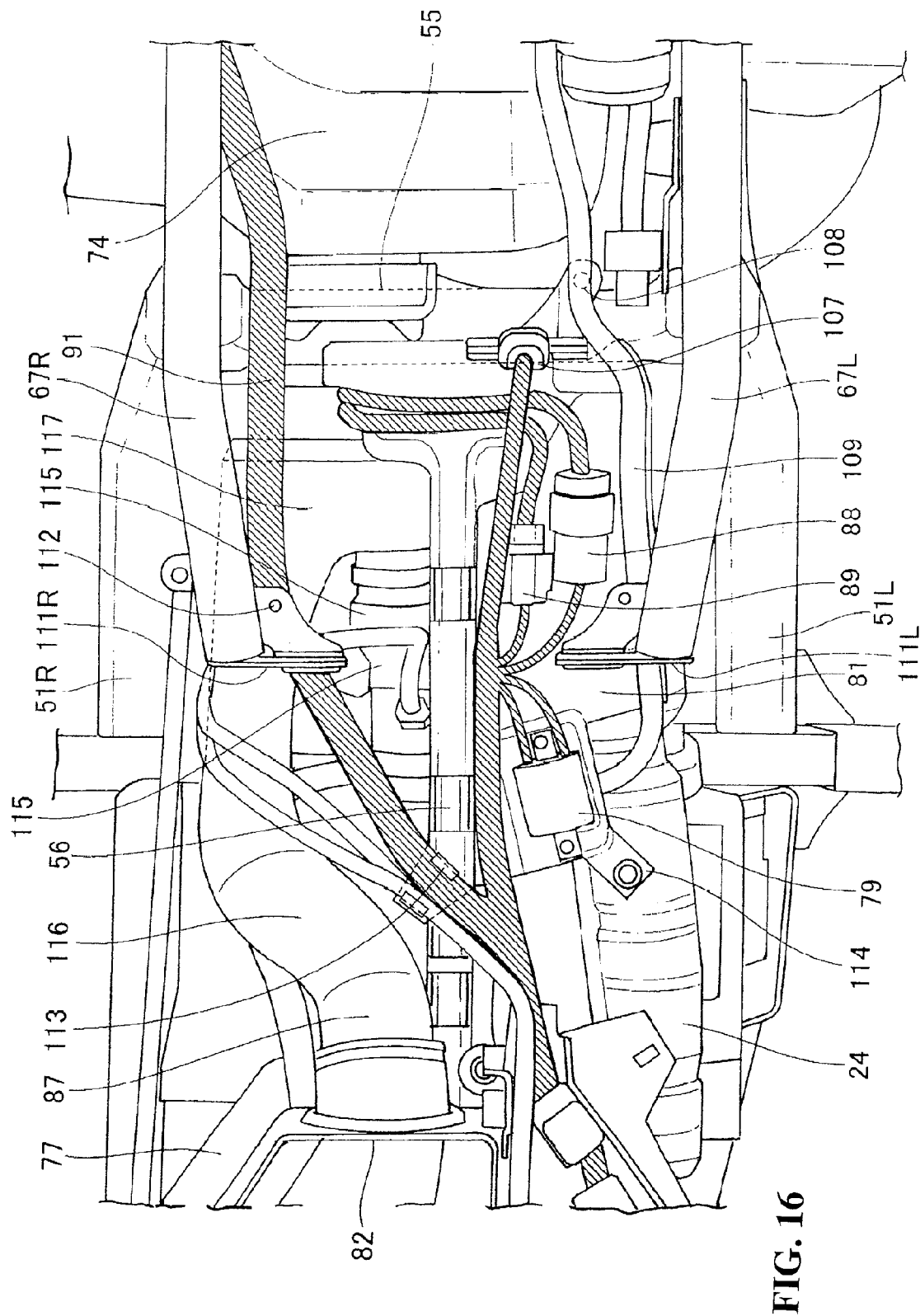
FIG. 16 is an enlarged view of the electrical component support portion.

As shown in FIG. 16, the electrical component support portion 81 is mounted on the upper tension pipe 56, and the ignition coil 79, the ACG coupler 88, the change switch coupler 89, the bank angle sensor 107, and the like are mounted on the plate-shaped electrical component support portion 81.

The rear portion of the plate-shaped electrical component support portion 81 is supported on a stay 108 of the fuel tank 74. The fuel hose 109 extending from the fuel tank 74 is supported on a guide portion provided on the left edge of the electrical component support portion 81, and extends towards the front of the vehicle.

Although the fuel hose 109 is supported by the electrical component support portion 81, when the support portion is on the left in the transverse direction of the vehicle with respect to the upper tension pipe 56, the main harness 91 is disposed on the right with respect to the transverse direction of the vehicle. The fuel hose 109 and the main harness 91 are disposed to improve the right and left balance with respect to the upper tension pipe 56.

A seat catcher 111L, 111R is disposed on the front end of the rear pipe 67L, 67R. The main harness 91 is supported by a clip 112 on the right seat catcher 111R. Furthermore the main harness 91 is supported through a stay 113 on the electrical component support portion 81 in proximity to the ignition coil 79. The stay 113 is provided to incline by rotating in a counterclockwise direction with respect to the vehicle body longitudinal axis so that the main harness 91 is oriented towards the right rear pipe 67R. As a result, the thick main harness 91 can displace smoothly with respect to the transverse direction of the vehicle.

The fuel tank 74 is disposed behind the electrical component support portion 81 in the vehicle. The harness can be routed at a position separated from the fuel tank 74, and therefore improves workability.

Furthermore the rear portion of the electrical component support portion 81 expands in the transverse direction of the vehicle along the second cross portion 55 to thereby cover a connection portion between the second cross portion 55 and the rear portion of the upper tension pipe 56. In the present example, a harness extending from the rear surface of the change switch coupler 89 or a harness extending from the rear surface of the AGC coupler 88 is mounted on this expanded portion. The connection portion between the second cross portion 55 and the rear portion of the upper tension pipe 56 tends to include burr or projections as a result of welding. However when the connection portion is covered by the rear portion of the electrical component support portion 81, there is no risk of damage to the harness or the electrical components by reason of such burr or projections.

The plate-shaped electrical component support portion 81 extends in a forward direction in the vehicle from the rear pipe 67L, and the main harness 91 is supported by the front end of the rear pipe 67R and the front end of the electrical component support portion 81. If it is assumed that the main harness is routed from the transverse center of the vehicle outwardly from the vehicle width while curving into a crank shape, the problem arises that the length of the harness is increased, or curving becomes difficult since the main harness is comparatively thick and therefore that assemblability are adversely affected. In relation to this point, the above configuration in the present embodiment enables a solution to this problem while strongly supporting the main harness 91.

A cover stay portion 114 mounting the vehicle body cover is provided on the front left portion of the electrical component support portion 81.

In other words, the electrical component support portion 81 performs the role of supporting the vehicle body cover.

The connecting tube 87 extends from the battery storage box 82 towards the rear of the vehicle. However firstly a curving depressed portion 116 orients the connecting tube 87 downwardly while curving towards the transverse direction of the vehicle, then extends towards the rear of the vehicle to pass through the side portion of a throttle body 115 that is disposed on the center of the vehicle body, and then bends towards the center of the vehicle body by a turn portion 117 through substantially 90 degrees. The distal end is inserted under the upper tension pipe 56.

The turn portion 117 has a large diameter, and is adapted to reduce the flow resistance.

In other words, the connecting tube 87 is adapted in the shape of substantially the letter J in plan view and is wound to enclose the throttle body 115.

In other words, as shown in FIG. 15, the connecting tube 87 is oriented downwardly by the curving depressed portion 116 and the distal end is inserted under the upper tension pipe 56.

As shown in FIG. 6, the electrical component support portion 81 is supported by the upper end (upper surface) of the upper tension pipe 56, and in addition, forms a step that is positioned lower than the upper end of the upper tension pipe 56 to thereby store the electrical components such as the ignition coil 79 on the step.

As shown in FIG. 16, since the connecting tube 87 and the throttle body 115 are disposed on one side (in the embodiment, the right side in a transverse direction of the vehicle) with respect to the upper tension pipe 56, and the electrical component support portion 81 is disposed on the other side (in the embodiment, the left side in a transverse direction of the vehicle), the space is effectively used, and the throttle body 115 does not impede the electrical component support portion 81. Accordingly, the maintainability of the throttle body 115 can be improved.

Furthermore the exhaust pipe 24 is disposed below the plate-shaped electrical component support portion 81. Since the electrical component support portion 81 plays the role of a heat shielding plate, the ignition coil 79, the ACG coupler 88, and the change switch coupler 89 are protected from heat.

Figure 17:
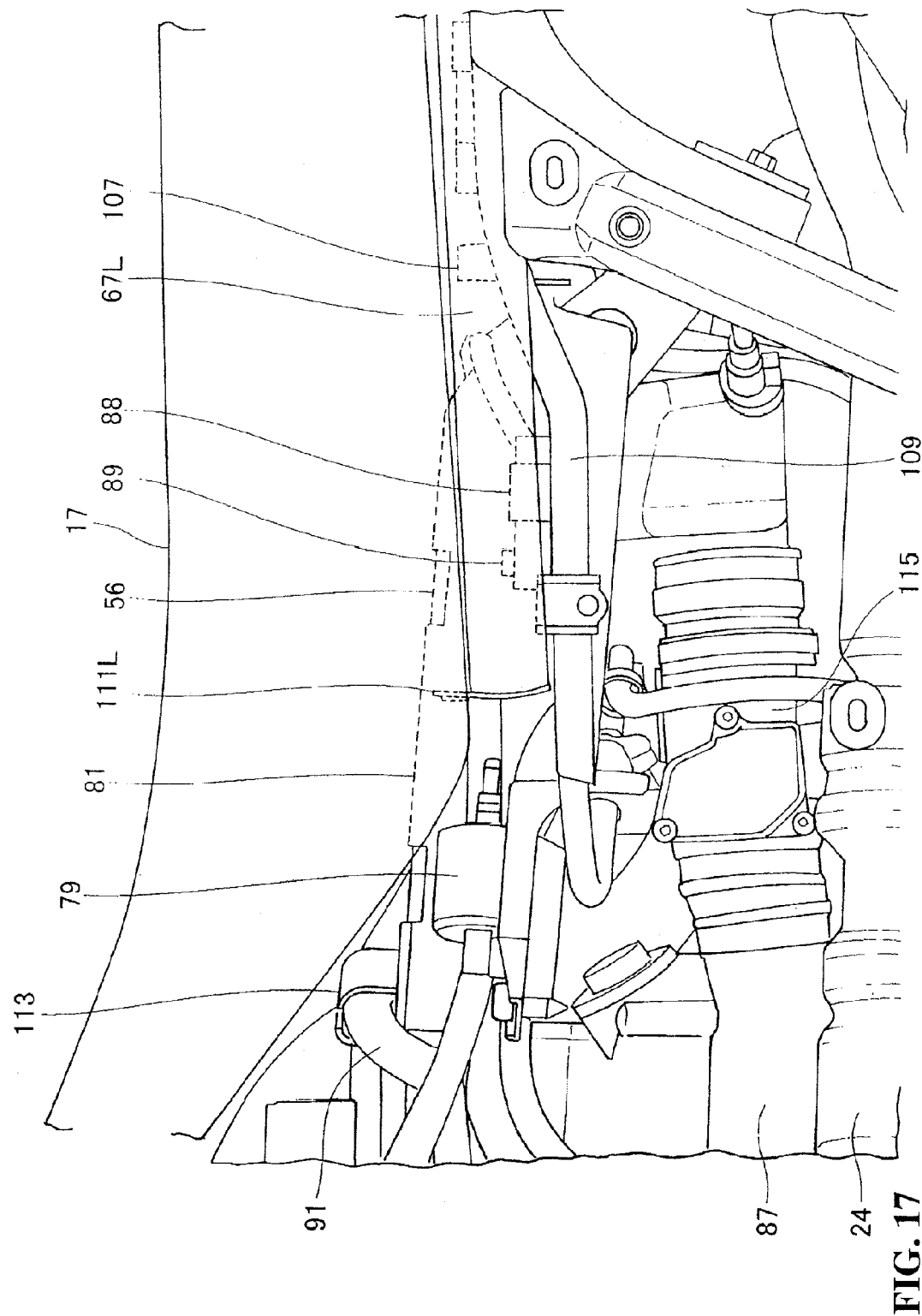
FIG. 17 is a left-side view of an intermediate portion of the vehicle.

As shown in FIG. 17, the seat catcher 111L is provided on the front end of the rear pipe 67L, and the seat 17 is retained by the seat catcher 111L.

Furthermore the ignition coil 79, the ACG coupler 88, and the change switch coupler 89 are disposed on a position that is lower than the upper face of the upper tension pipe 56, and therefore there is no risk of application of a downward load from the seat 17.

Since the ACG coupler 88, the change switch coupler 89, the bank angle sensor 107 and the fuel hose 109 are disposed on a position that is superimposed on the rear pipe 67L, there is a reduction in the risk of a downward load of the seat 17 applied to these components. In addition, the protective effect for these electrical components can be improved. Furthermore the electrical component support portion 81 is installed more efficiently in the confined space under the seat, and thereby enables installation of the electrical components.

The main harness 91 is supported by the stay 113 on a front portion of the electrical component support portion 81. A throttle body 115 is disposed below the electrical component support portion 81, and the exhaust pipe 24 is disposed below the throttle body 115.

Although the structure of the vehicle body frame according to the present invention can be applied to a small vehicle, and in particular to an all terrain vehicle, it may also be applied to a general vehicle.

The structure of the vehicle body frame according to the present invention is suitably applied to an all terrain vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising:
   a vehicle body frame;
   a power generating engine mounted on the vehicle body frame for generating power; and
   a power transmission apparatus for transmitting output generated by the power generating engine to a vehicle wheel;
   wherein the vehicle body frame includes:
   a pair of right and left main frames passing below the power generating engine in a longitudinal direction of the vehicle, each main frame having a rear portion that curves upwardly;
   right and left front-wheel suspension support portions, each configured from a frame or a pipe that extends upwardly from a front portion of the respective main frame and each front-wheel suspension support portion supporting a front-wheel suspension apparatus;
   a first cross portion passing in a transverse direction of the vehicle from the left front-wheel suspension portion to the right front-wheel suspension portion;
   a second cross portion passing in the transverse direction of the vehicle from a curved portion of a rear portion of the left main frame to a curved portion of the rear portion of the right main frame; and
   an upper tension pipe disposed on a vehicle body center line and passing above the power generating engine in the longitudinal direction of the vehicle, said upper tension pipe having a front end thereof mounted detachably on the first cross portion and a rear end thereof mounted detachably on the second cross portion.

2. The vehicle according to claim 1,
   wherein each of the right and left front-wheel suspension support portions includes a front pipe portion extending upwardly from the right and left main frame, respectively, and front tension bracket portions for reinforcing the respective front pipe portions by passing in an inclining configuration across an upper portion of the front pipe portions and the main frames;
   wherein upper ends of each of the front pipe portions are connected by the first cross portion, said first cross portion being configured by a U-shaped pipe portion opening downwardly when viewed from a front of the vehicle and connected to the right and left front pipe portions; and
   wherein the front pipe portions and the U-shaped pipe portion are configured by a single curved pipe.

3. The vehicle according to claim 2,
   wherein a front shock absorber mounting portion that mounts a front shock absorber is provided on the front pipe portion; and
   a rear shock absorber mounting portion that mounts an upper portion of a rear shock absorber is provided on the second cross portion.

4. The vehicle according to claim 3,
   wherein the rear shock absorber is disposed in an inclining configuration so that a lower portion is positioned in a rear of the vehicle relative to the upper portion, and a rear portion of the upper tension pipe is curved to incline downwardly to follow an inclined rear shock absorber shaft; and
   the upper ends of each of the front pipe portions is curved so that they extend toward the rear of the vehicle more than the lower ends thereof.

5. The vehicle according to claim 4,
   wherein a front steering shaft bearing portion supports a steering shaft in the first cross portion,
   a rear steering shaft bearing portion supports the steering shaft on a front end of the upper tension pipe; and
   the steering shaft is rotatably supported by aligning the front steering shaft bearing and the rear steering shaft bearing with the longitudinal direction of the vehicle.

6. The vehicle according to claim 3,
   wherein a front steering shaft bearing portion supports a steering shaft in the first cross portion, a rear steering shaft bearing portion supports the steering shaft on a front end of the upper tension pipe; and the steering shaft is rotatably supported by aligning the front steering shaft bearing and the rear steering shaft bearing with the longitudinal direction of the vehicle.

7. The vehicle according to claim 2, wherein a front steering shaft bearing portion supports a steering shaft in the first cross portion, a rear steering shaft bearing portion supports the steering shaft on a front end of the upper tension pipe; and the steering shaft is rotatably supported by aligning the front steering shaft bearing and the rear steering shaft bearing with the longitudinal direction of the vehicle.

8. The vehicle according to claim 2, wherein an accessory equipment support portion supports accessory equipment, including at least one of an air cleaner and a battery, and an electrical component support portion supports electrical components, including an ignition coil, attached to the upper tension pipe.

9. The vehicle according to claim 2, wherein a height and width of the main frame decrease with respect to a central portion, as the front portion moves forward in the longitudinal direction of the vehicle, and a height and a width of the main frame decrease with respect to the central portion, as the rear portion moves rearwardly in the longitudinal direction of the vehicle.

10. The vehicle according to claim 2, wherein when the vehicle is viewed in a plan configuration, a front curved portion and a rear curved portion are provided on the right and left main frames, wherein an interval between the right and left main frames in the transverse direction of the vehicle of the front portion and the rear portion is narrow relative to a central portion.

11. The vehicle according to claim 1, wherein a front steering shaft bearing portion supports a steering shaft in the first cross portion, a rear steering shaft bearing portion supports the steering shaft on a front end of the upper tension pipe; and the steering shaft is rotatably supported by aligning the front steering shaft bearing and the rear steering shaft bearing with the longitudinal direction of the vehicle.

12. The vehicle according to claim 11, wherein a power steering unit is sandwiched by right and left front tension brackets by fixing the power steering unit that assists in rotational operation of the steering shaft to the right and left front tension brackets.

13. The vehicle according to claim 1, wherein an accessory equipment support portion supports accessory equipment, including at least one of an air cleaner and a battery, and an electrical component support portion supports electrical components, including an ignition coil, attached to the upper tension pipe.

14. The vehicle according to claim 1, wherein a height and width of the main frame decrease with respect to a central portion, as the front portion moves forward in the longitudinal direction of the vehicle, and a height and a width of the main frame decrease with respect to the central portion, as the rear portion moves rearwardly in the longitudinal direction of the vehicle.

15. The vehicle according to claim 1, wherein when the vehicle is viewed in a plan configuration, a front curved portion and a rear curved portion are provided on the right and left main frames, wherein an interval between the right and left main frames in the transverse direction of the vehicle of the front portion and the rear portion is narrow relative to a central portion.

* * * * *